(12) United States Patent
Granger et al.

(10) Patent No.: US 11,624,097 B2
(45) Date of Patent: Apr. 11, 2023

(54) EVAPORATOR SYSTEM, KIT FOR ASSEMBLING THE SAME, AND CORRESPONDING METHODS OF ASSEMBLING, OPERATING AND USE ASSOCIATED THERETO

(71) Applicant: LES EQUIPEMENTS LAPIERRE INC., St-Ludger (CA)

(72) Inventors: Jean-Claude Granger, Ste-Catherine-de-Hatley (CA); Luc Briere, Val-des-Sources (CA); Louis Lacasse, St-Etienne-de-Bolton (CA); Gabriel Boucher, Roxton Falls (CA)

(73) Assignee: LES EQUIPEMENTS LAPIERRE INC., St-Ludger (CA)

( * ) Notice: Subject to any disclaimer, the term of this patent is extended or adjusted under 35 U.S.C. 154(b) by 21 days.

(21) Appl. No.: 17/302,899

(22) Filed: May 14, 2021

(65) Prior Publication Data

US 2021/0371942 A1    Dec. 2, 2021

Related U.S. Application Data

(60) Provisional application No. 63/024,629, filed on May 14, 2020.

(51) Int. Cl.
| | |
|---|---|
| *B01D 1/00* | (2006.01) |
| *C13B 25/04* | (2011.01) |
| *F24B 5/02* | (2006.01) |
| *F24B 13/00* | (2006.01) |

(52) U.S. Cl.
CPC ............ *C13B 25/04* (2013.01); *B01D 1/0029* (2013.01); *B01D 1/0082* (2013.01); *F24B 5/026* (2013.01); *F24B 13/004* (2013.01)

(58) Field of Classification Search
CPC .... B01D 1/0029; B01D 1/0082; C13B 25/04; F24B 5/026; F24B 13/004
See application file for complete search history.

(56) References Cited

U.S. PATENT DOCUMENTS

| | | | | |
|---|---|---|---|---|
| 4,796,602 A | * | 1/1989 | Atkinson | ................ F23L 15/00 159/32 |
| 4,819,615 A | * | 4/1989 | Richardson | .............. B01D 1/26 127/16 |

(Continued)

*Primary Examiner* — Jonathan Miller

(57) ABSTRACT

Evaporator system used for the production of maple syrup. The evaporator system includes at least one receptacle, a combustion chamber, an evacuation port and an air supply system. The evaporator system also includes a door assembly being configured for removably mounting onto a corresponding support frame of the evaporator system, and being operable between an opened configuration for allowing access to the combustion chamber and to be able to selectively feed biomass into the combustion chamber via the inlet thereof, and a closed configuration for preventing access to and closing off the inlet of the combustion chamber, the door assembly being provided with at least one aeration passage extending between an outer portion of the door assembly and an inner portion therefor, for providing a supply of secondary air to the combustion chamber via said at least one aeration passage of the door assembly when operated in the closed configuration.

19 Claims, 27 Drawing Sheets

(56) References Cited

U.S. PATENT DOCUMENTS

| | | | | |
|---|---|---|---|---|
| 4,953,538 | A * | 9/1990 | Richardson | C13B 25/001 |
| | | | | 127/16 |
| 5,772,774 | A * | 6/1998 | Chabot | B01D 1/10 |
| | | | | 127/2 |
| 9,309,576 | B2 * | 4/2016 | Tay | B01D 9/0063 |
| 2012/0085339 | A1 * | 4/2012 | Eldabbagh | F23L 15/04 |
| | | | | 126/344 |
| 2012/0272876 | A1 * | 11/2012 | Bergeron | F23B 40/08 |
| | | | | 110/297 |
| 2021/0115525 | A1 * | 4/2021 | Lapierre | C13B 25/04 |
| 2021/0371942 | A1 * | 12/2021 | Granger | F24B 13/004 |

* cited by examiner

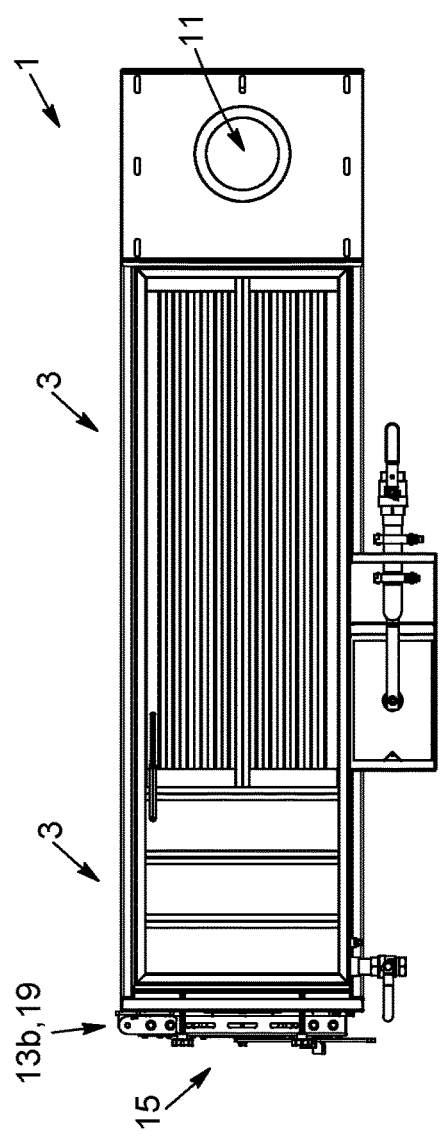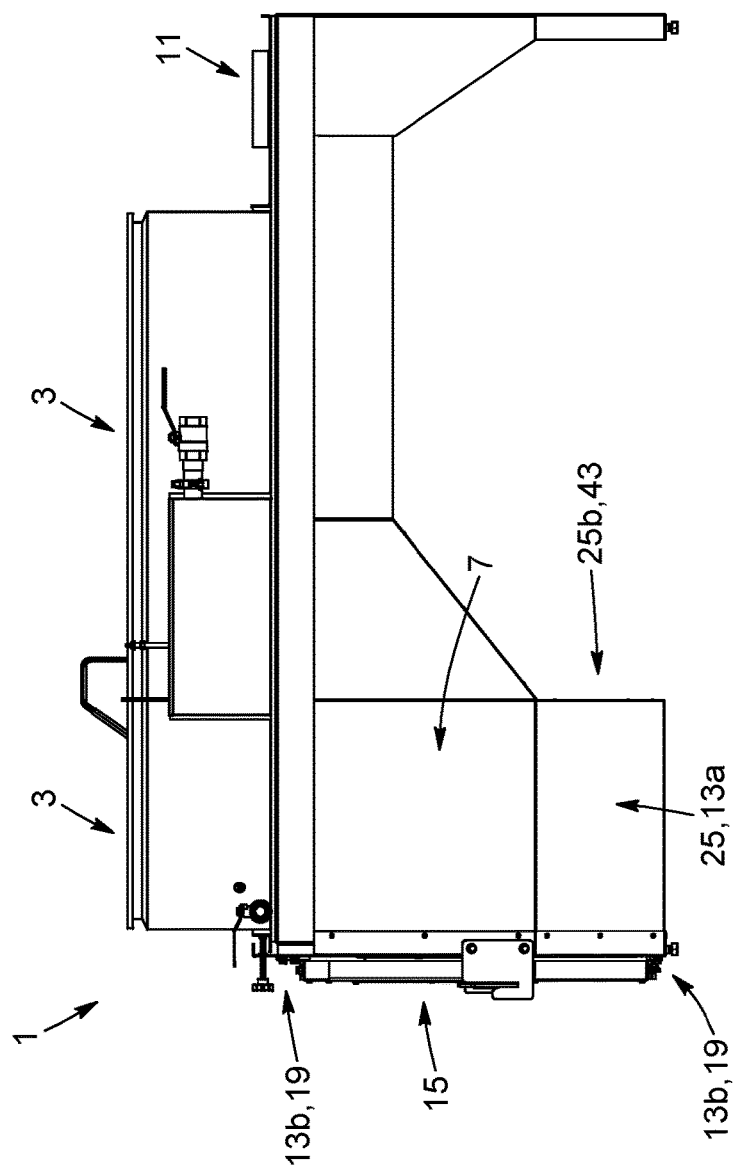

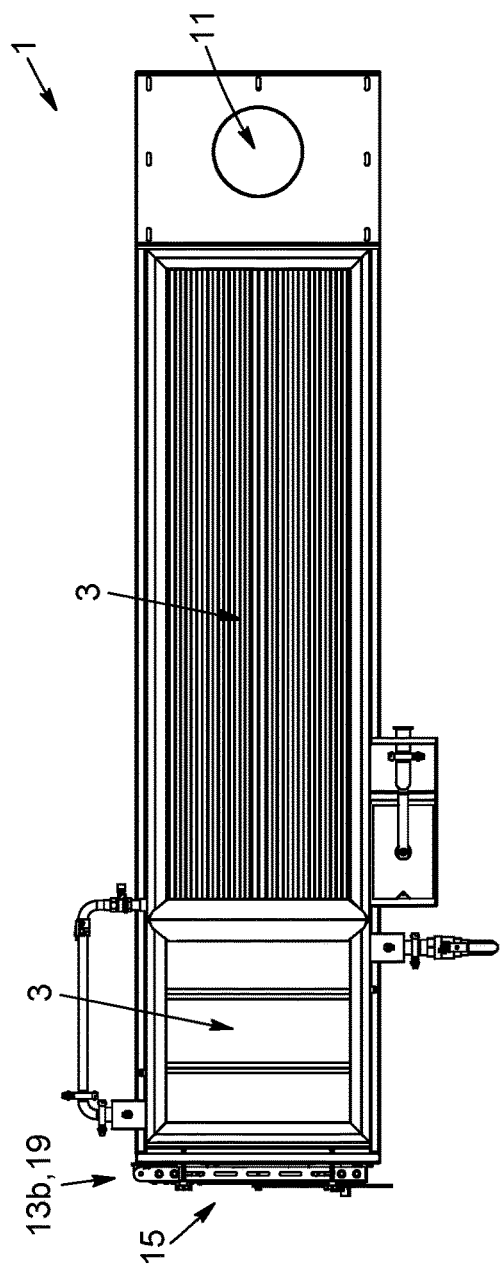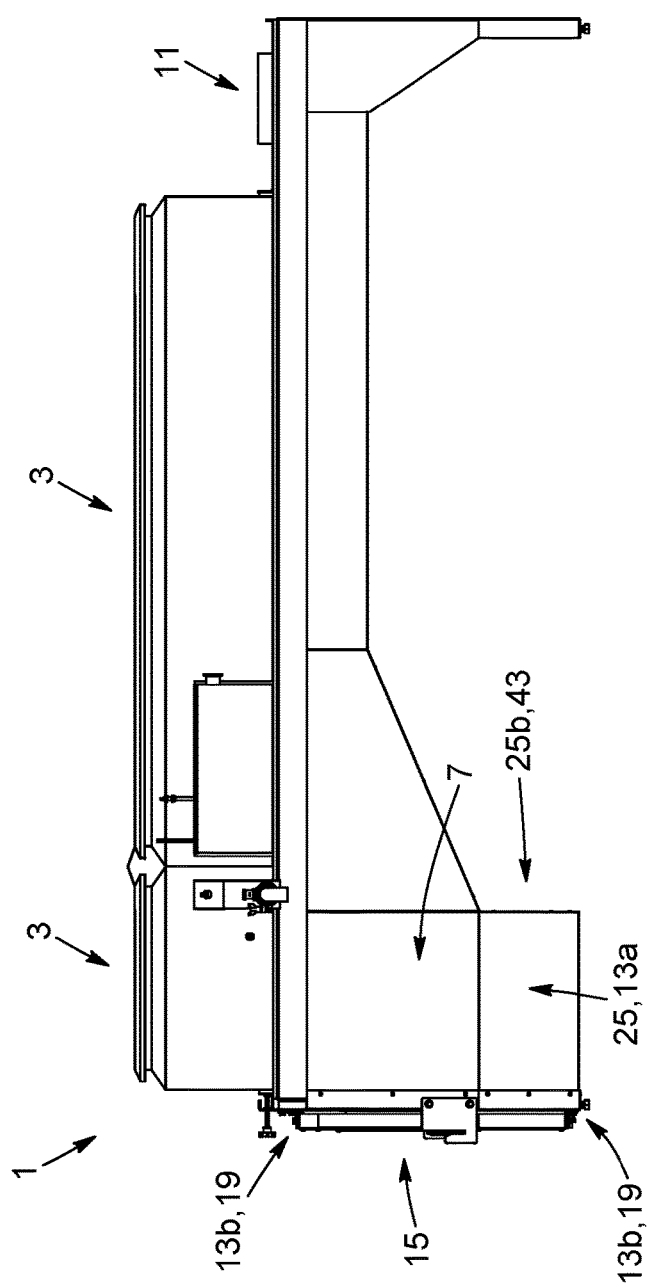

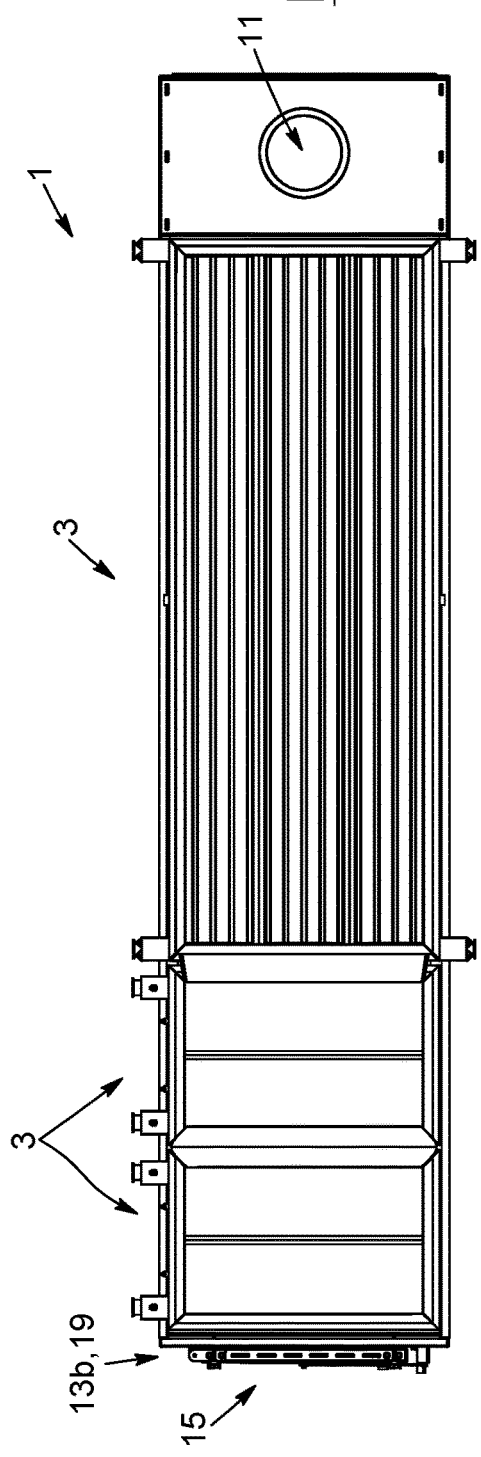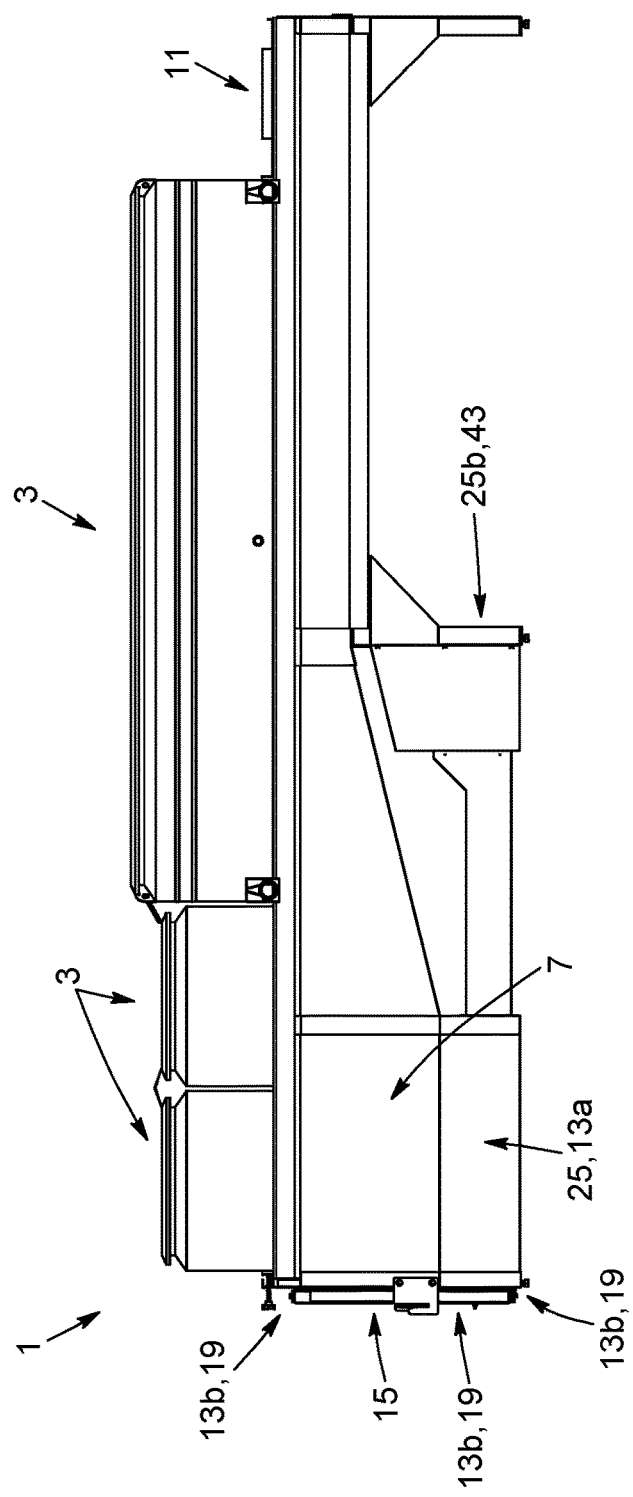

EVAPORATOR SYSTEM, KIT FOR ASSEMBLING THE SAME, AND CORRESPONDING METHODS OF ASSEMBLING, OPERATING AND USE ASSOCIATED THERETO

FIELD OF THE INVENTION

The present invention relates to the field of the production of syrup, such as maple syrup, for example, and/or any other type of syrup. More particularly, the present invention relates to an evaporator system, and also relates to a kit with corresponding components for assembling the same, and to corresponding methods of manufacturing, operating and/or use associated thereto. The present patent application claims priority of U.S. provisional patent application No. 63/024,629 filed May 14, 2020, the content of which is incorporated herein by reference.

BACKGROUND

The process of transforming maple sap into maple syrup requires the increase in sugar content of the maple sap, by water evaporation and cooking the sugar. Maple syrup evaporators are used for this purpose. Typically, the energy source of maple syrup evaporators is either biomass or hydrocarbons. Biomass can take the form of firewood or wood residue transformed into woodchips or wood pallets, for example.

To optimize biomass combustion and control the transformation process of maple sap into maple syrup, it is necessary to control the flow of combustion air admitted into the combustion chamber and the injection points of said combustion air. Typically, combustion air is admitted to the combustion chamber through the chimney, which generates a negative air pressure to the combustion chamber. This "pulling" effect is generated by hot fumes of the combustion process, which are less dense than surrounding air, which causes the upward movement of said fumes. It is also typical and possible to use a fan that forces the combustion air into the combustion chamber, and the flow of said air can be regulated by different systems.

Additionally, specific heat exchangers are required for two (2) main functions: "evaporation" and "cooking". Typically, the heat exchanger used for evaporation, has a high ratio of heat exchange surface to occupied surface. Said ratio is obtained by different methods. On the other hand, the heat exchanger for the cooking of sugar, typically has a surface ratio of 1.

Despite known improvements over the years, there is always a need to continue innovating and finding better and/or different ways of operating evaporator systems and/or various aspects thereof (ex. combustion chamber, introduction of combustion air, etc.), for example, and to be able to do so, in a quicker, simpler, more precise, more efficient, more economical, more reliable, more adjustable, more versatile, more adaptable, more durable, more environmentally conscientious, more desirable, and/or improved manner, than what is possible with the actual way of doing things.

Therefore, it would be particularly useful to be able to provide an improved evaporator system which would be able to overcome or at the very least minimize some of known drawbacks associated with conventional systems and ways of doing in the field of maple syrup production, for example.

SUMMARY OF THE INVENTION

An object of the present invention is therefore to provide an evaporator system which by virtue of its design and its components, would satisfy some of the above-mentioned needs, and which would thus be an improvement over other related evaporators, systems and/or methods known in the prior art.

The above main object is achieved, as will be better understood, by an evaporator system such as the one briefly described in the present description, and such as the one exemplified in the accompanying drawings.

More particularly, and according to one aspect of the present invention, an objective is to provide an evaporator system used for the production of syrup (ex. maple syrup), the evaporator system comprising:

at least one receptacle for receiving and processing sap water (ex. maple water) destined to be transformed into syrup (ex. maple syrup);
   a combustion chamber being operatively disposed with respect to said at least one receptacle for providing the same with heat intended to be used in the transformation of the sap water into syrup, the combustion chamber having an inlet for receiving and burning biomass inside of the combustion chamber;
an evacuation port being operatively and fluidly connected to the combustion chamber for evacuating exhaust gases from the combustion chamber via a corresponding chimney;
an air supply system being operatively mounted with respect to the combustion chamber for feeding the same with air intended to be used in the combustion of the biomass, the air supply system offering at least one type of air supply to the combustion chamber selected from the group consisting of at least primary air and secondary air; and
a door assembly being configured for removably mounting onto a corresponding support frame of the evaporator system, and being operable between an opened configuration for allowing access to the combustion chamber and to be able to selectively feed biomass into the combustion chamber via the inlet thereof, and a closed configuration for preventing access to and closing off the inlet of the combustion chamber, the door assembly being provided with at least one aeration passage extending between an outer portion of the door assembly and an inner portion therefor, for providing a supply of secondary air to the combustion chamber via said at least one aeration passage of the door assembly when operated in the closed configuration.

According to another aspect of the present invention, there is also provided a door assembly comprising at least one component and/or feature, as described and/or illustrated in the present specification, and intended to be used with the above-mentioned evaporator system.

According to another aspect of the present invention, there is also provided a kit with corresponding components for assembling the above-mentioned door assembly and/or evaporator system.

According to another aspect of the present invention, there is also provided a method of assembling components of the above-mentioned door assembly and/or evaporator system.

According to another aspect of the present invention, there is also provided a method of operating the above-mentioned door assembly and/or evaporator system.

According to another aspect of the present invention, there is also provided a method of using the above-mentioned door assembly and/or evaporator system.

According to another aspect of the present invention, there is also provided a set of components to be interchanged on the above-mentioned door assembly and/or evaporator system.

According to another aspect of the present invention, there is also provided a method of manufacturing one or another of the components of the above-mentioned door assembly and/or evaporator system.

According to another aspect of the present invention, there is also provided a product (ex. syrup, whether maple syrup and/or any other) having been obtained with the above-mentioned evaporator system, kit and/or method(s).

According to another aspect of the present invention, there is also provided a method of doing business with the above-mentioned door assembly, evaporator system, kit, method(s), set and/or product.

The objects, advantages, and other features of the present invention will become more apparent upon reading of the following non-restrictive description of preferred embodiments thereof, with reference to the accompanying drawings, and given for the purpose of exemplification only.

BRIEF DESCRIPTION OF THE ENCLOSED DRAWINGS

FIG. 2 is a top plan view of what is shown in FIG. 1.

FIG. 3 is a side elevational view of what is shown in FIG. 1.

FIG. 7 is a top plan view of what is shown in FIG. 6.

FIG. 8 is a side elevational view of what is shown in FIG. 6.

FIG. 12 is a top plan view of what is shown in FIG. 11.

FIG. 13 is a side elevational view of what is shown in FIG. 11.

Figure 1:
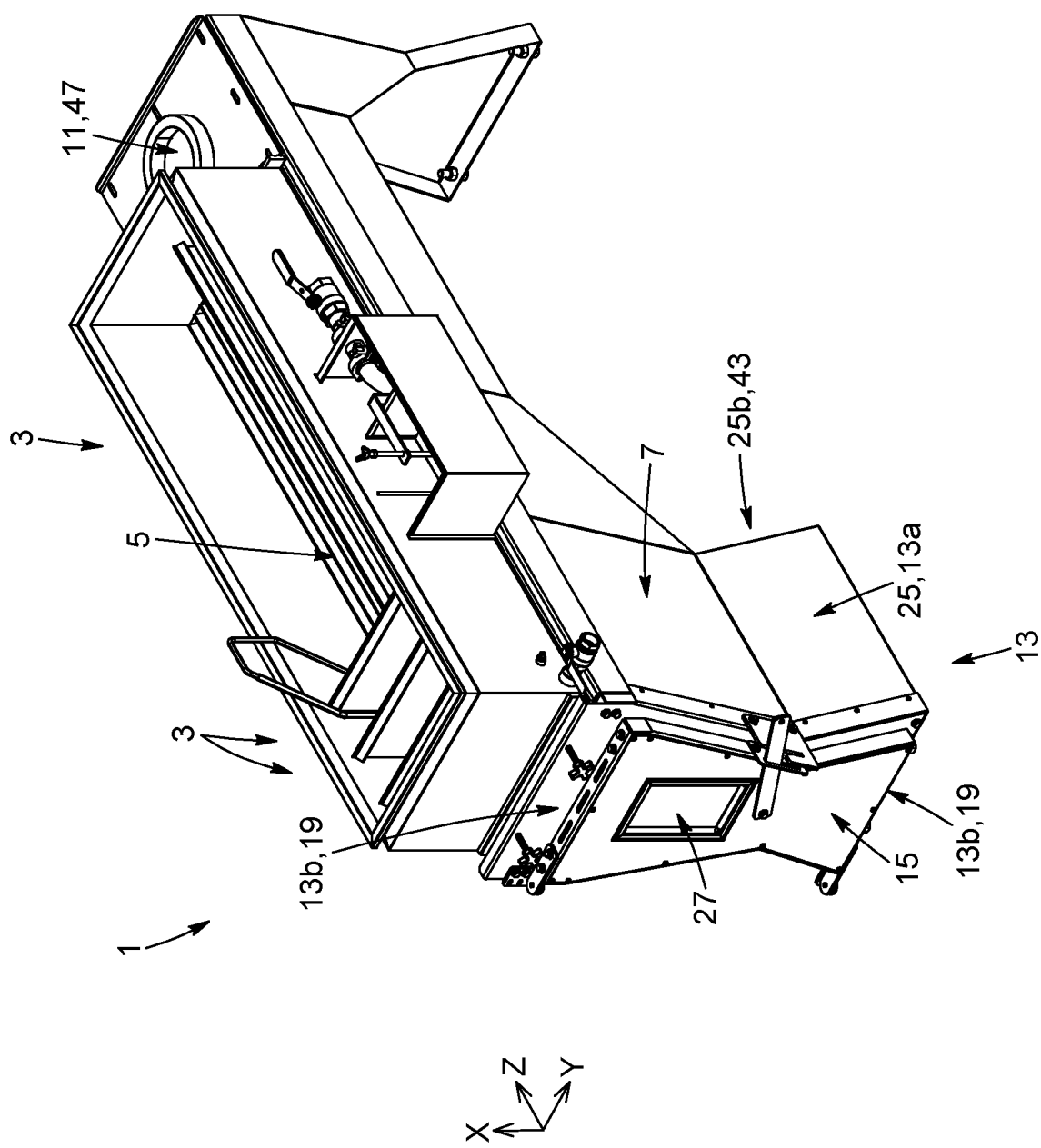
FIG. 1 is a top perspective view of an evaporator system according to a possible embodiment of the present invention.
Figure 5:
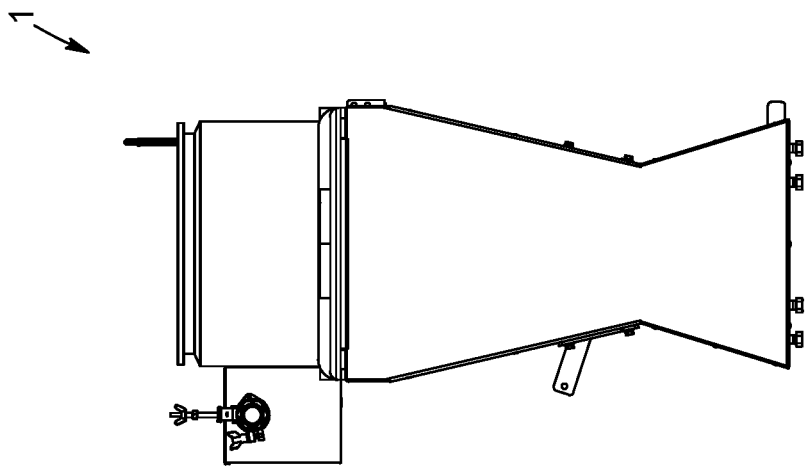
FIG. 5 is a rear elevational view of what is shown in FIG. 1.
Figure 4:
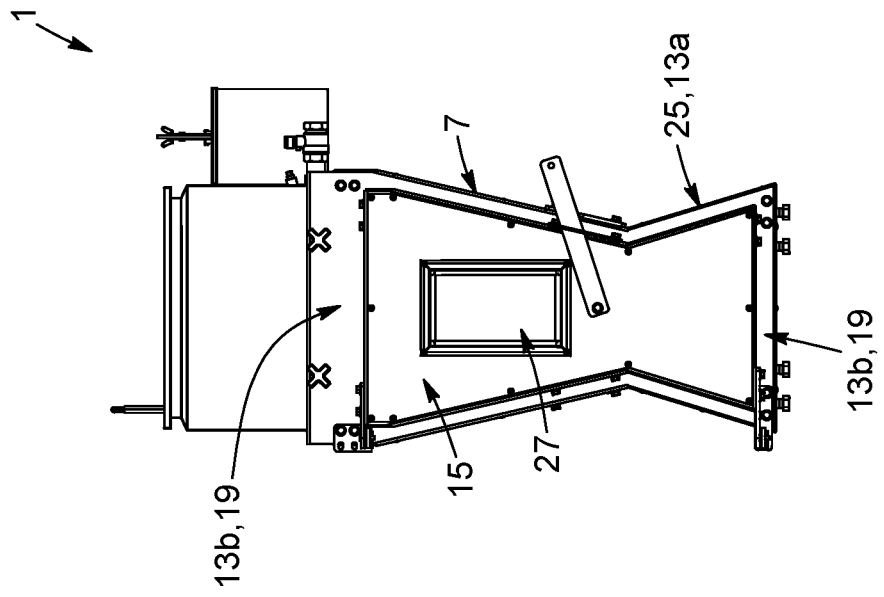
FIG. 4 is a front elevational view of what is shown in FIG. 1.
Figure 6:
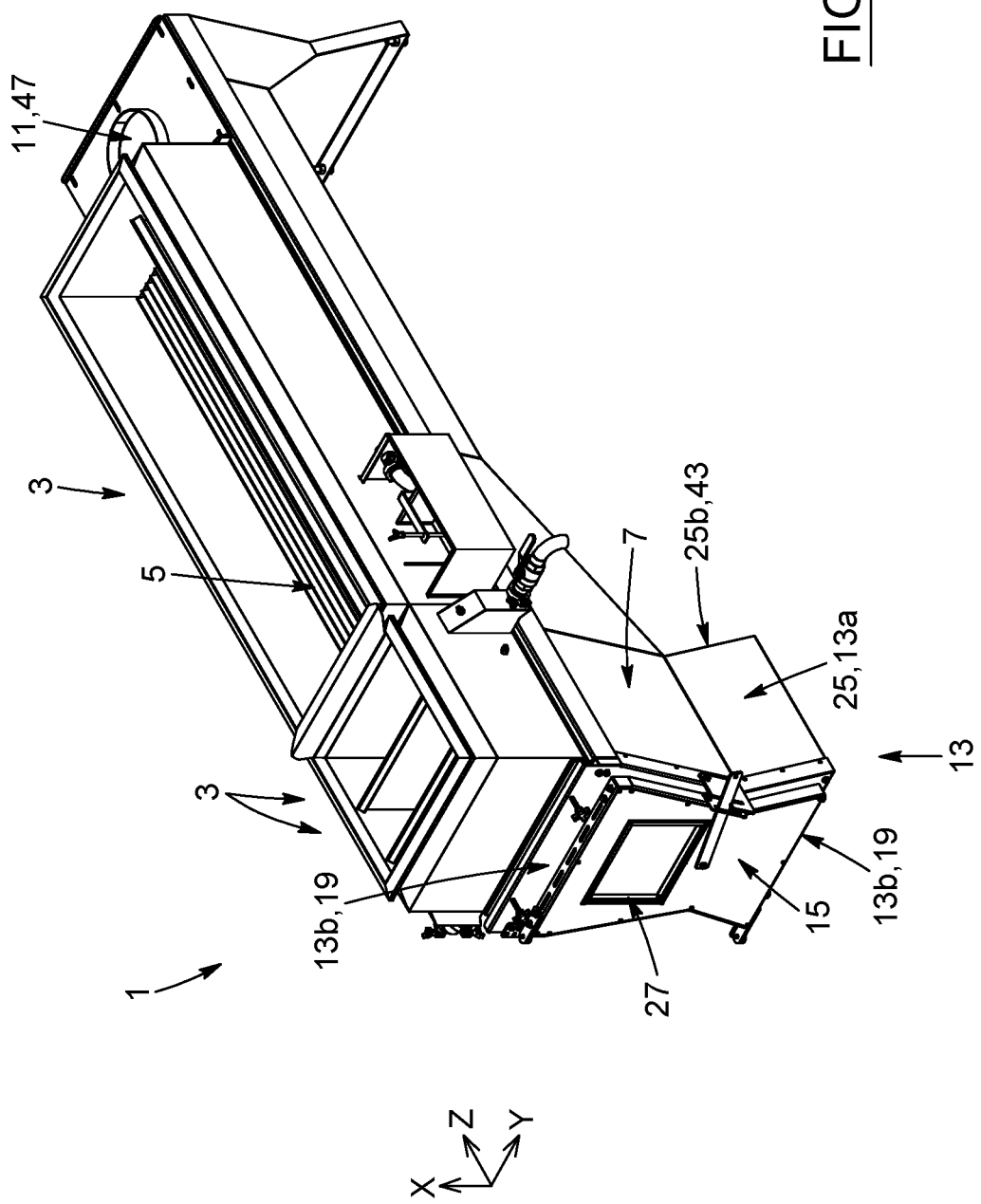
FIG. 6 is a top perspective view of an evaporator system according to another possible embodiment of the present invention.
Figure 10:
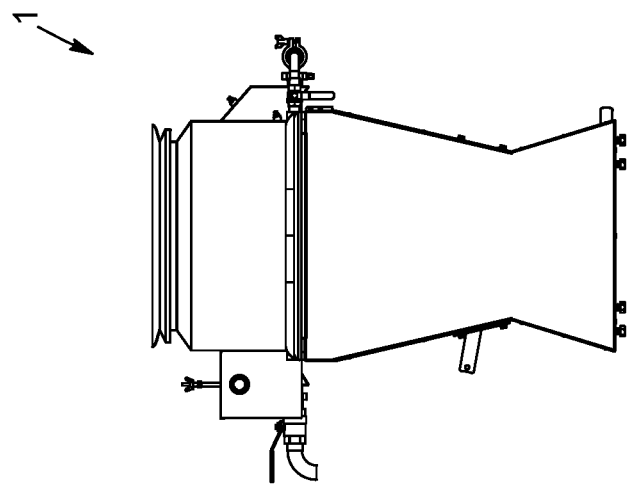
FIG. 10 is a rear elevational view of what is shown in FIG. 6.
Figure 9:
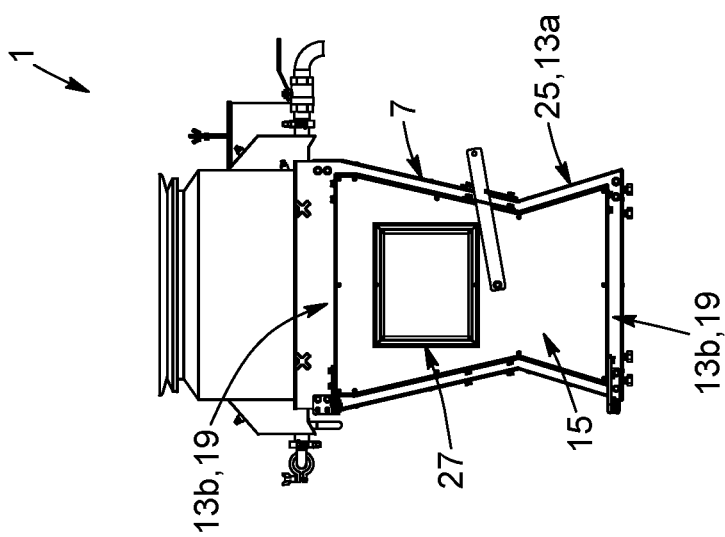
FIG. 9 is a front elevational view of what is shown in FIG. 6.
Figure 11:
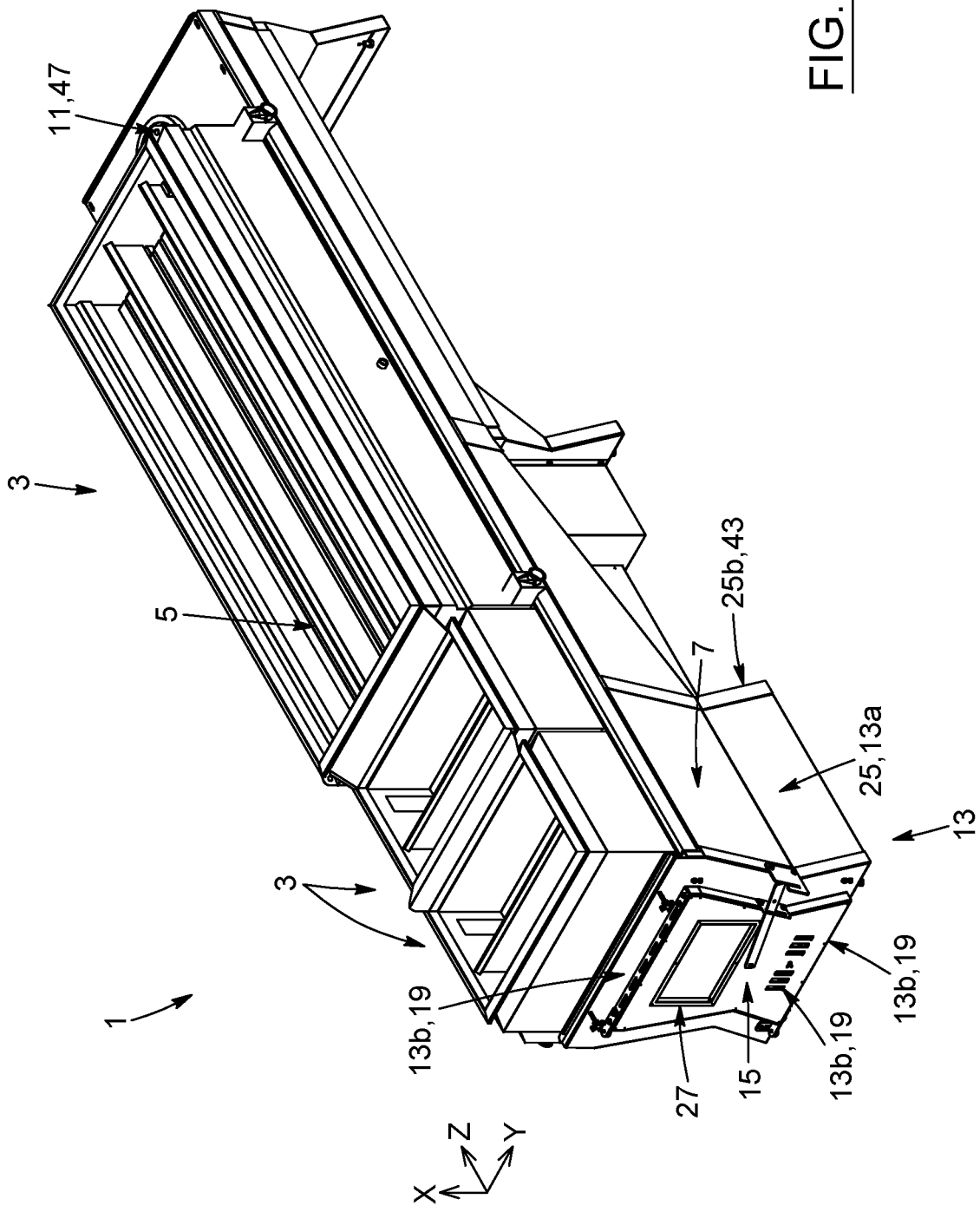
FIG. 11 is a top perspective view of an evaporator system according to yet another possible embodiment of the present invention.
Figure 15:
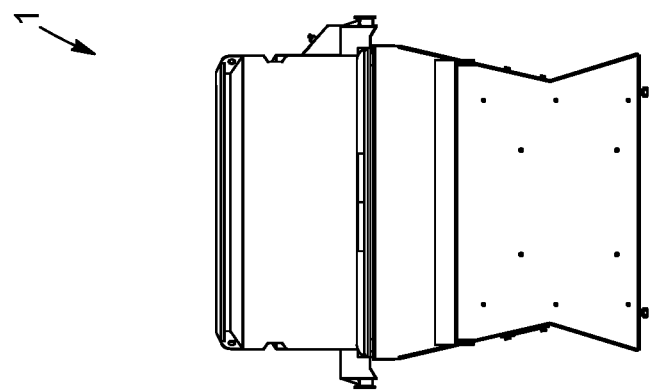
FIG. 15 is a rear elevational view of what is shown in FIG. 11.
Figure 14:
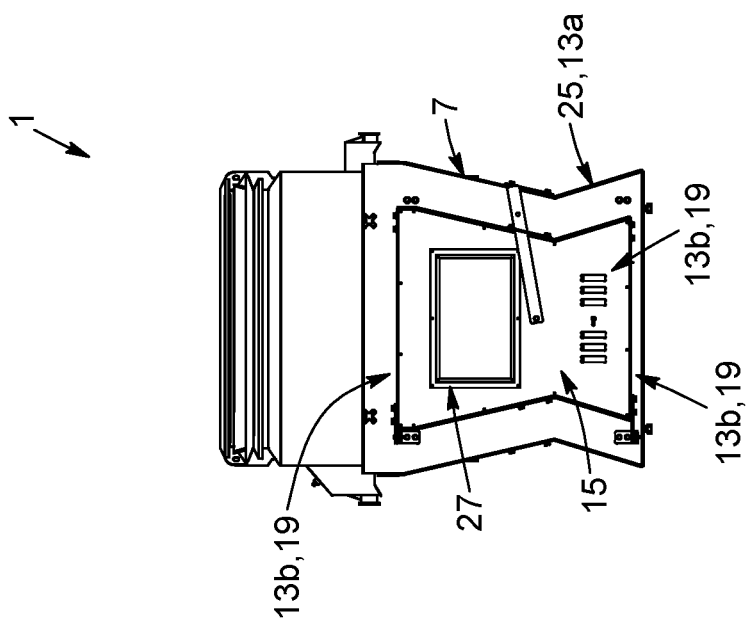
FIG. 14 is a front elevational view of what is shown in FIG. 11.
Figure 16:
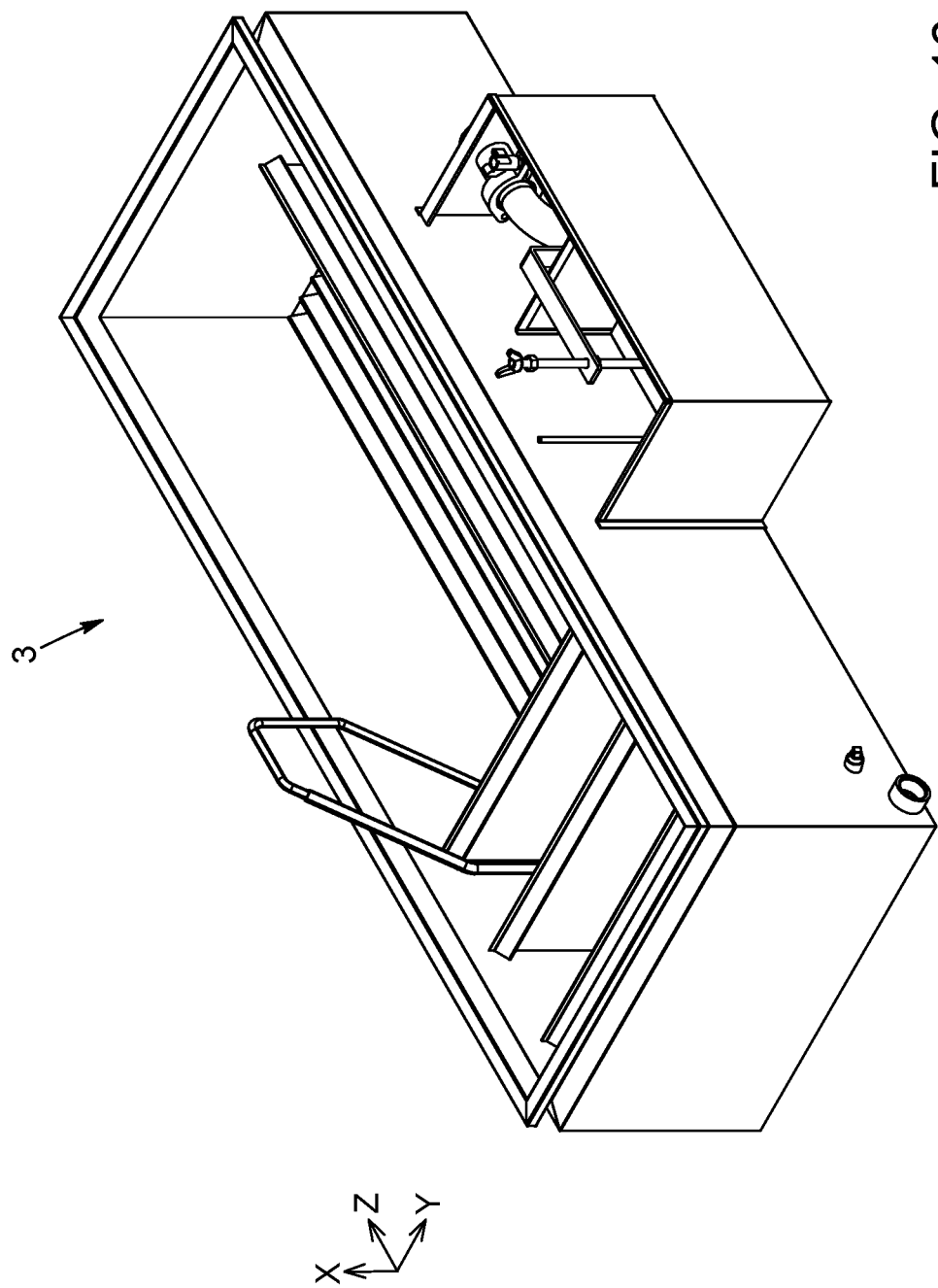
FIG. 16 is a top perspective view of a receptacle to be used with an evaporator system according to a possible embodiment of the present invention.
Figure 17:
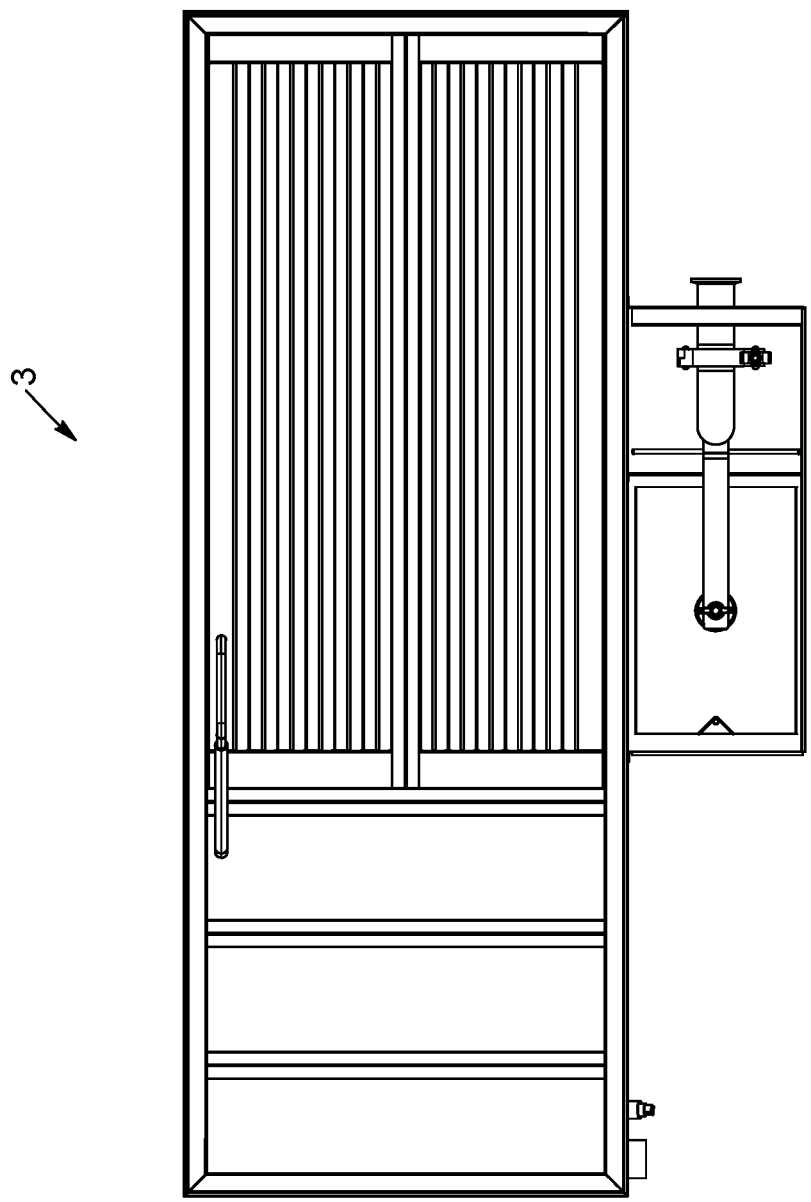
FIG. 17 is a top plan view of what is shown in FIG. 16.
Figure 18:
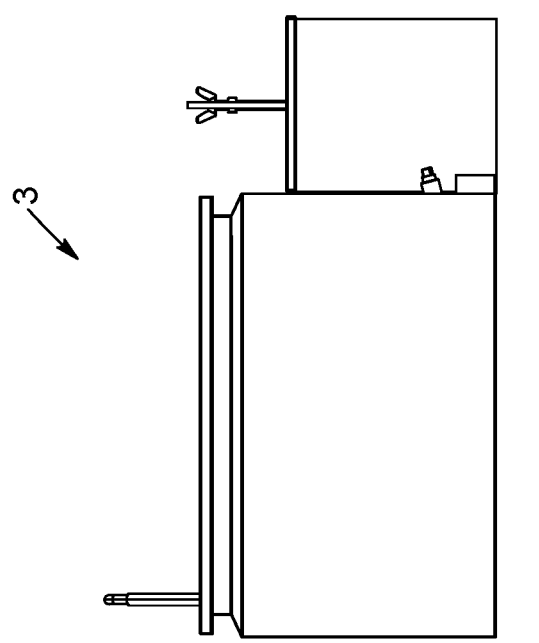
FIG. 18 is a front elevational view of what is shown in FIG. 16.
Figure 19:
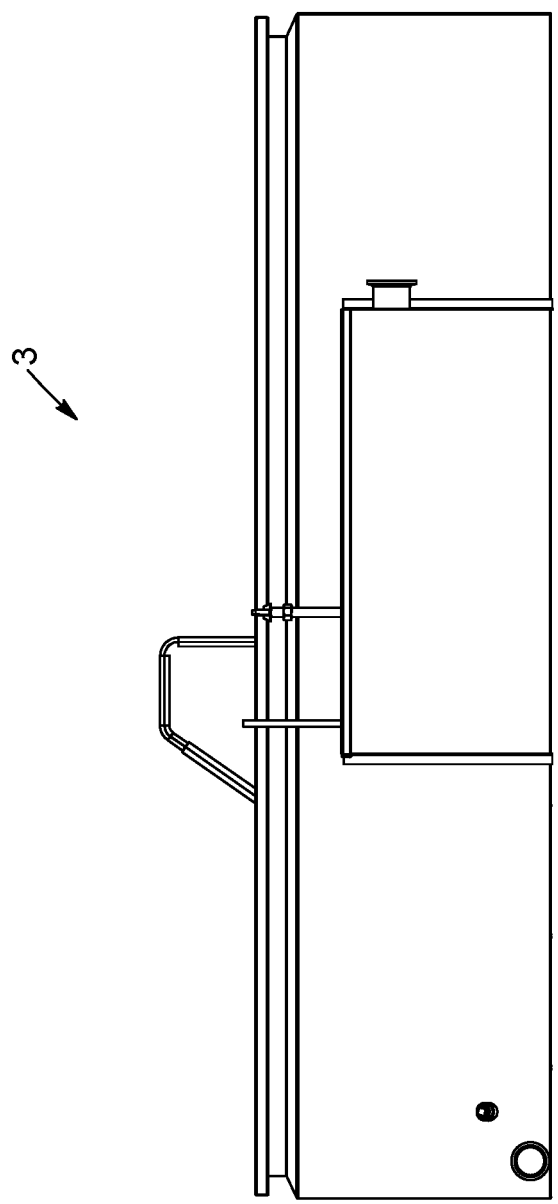
FIG. 19 is a side elevational view of what is shown in FIG. 16.
Figure 20:
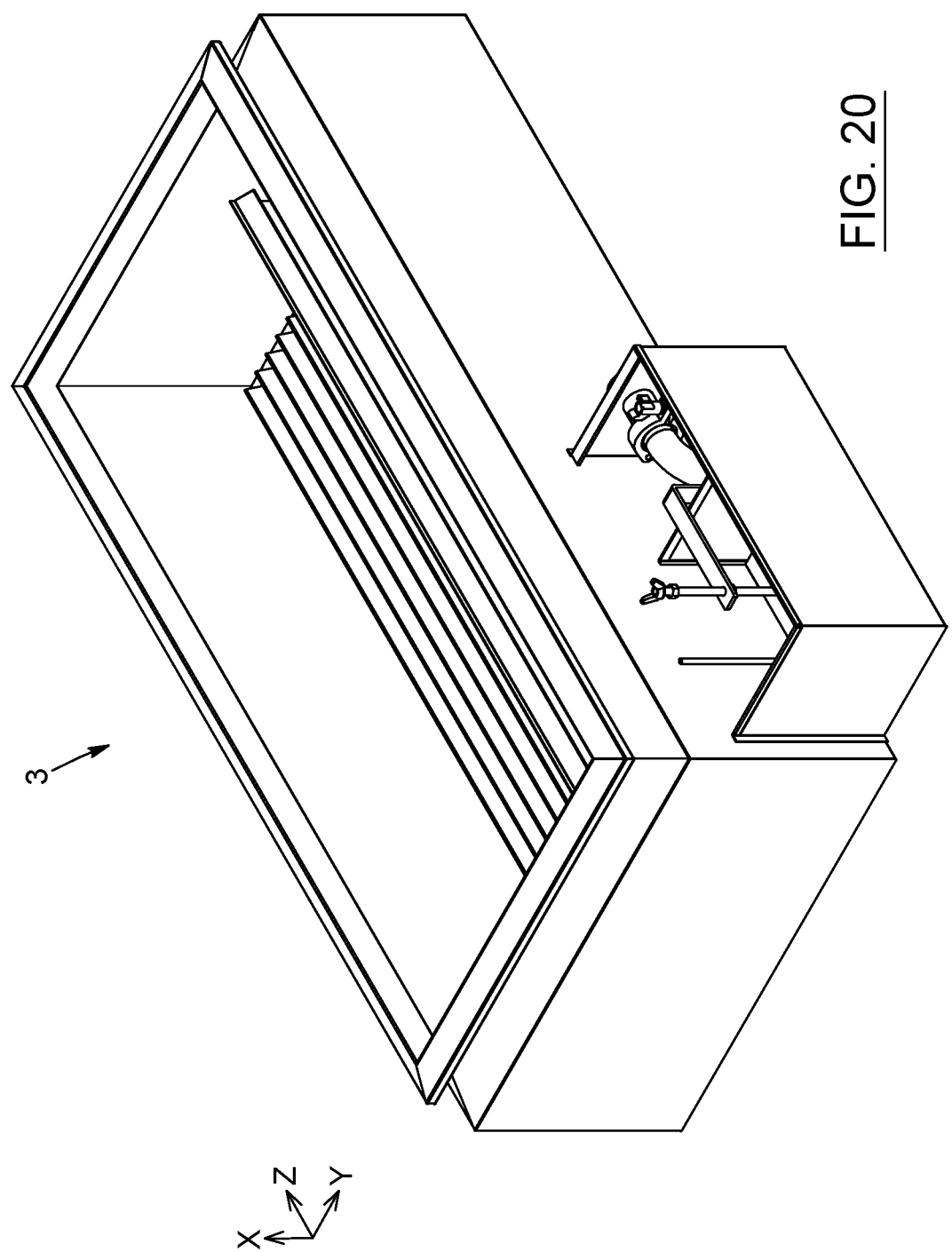
FIG. 20 is a top perspective view of a receptacle to be used with an evaporator system according to another possible embodiment of the present invention.
Figure 21:
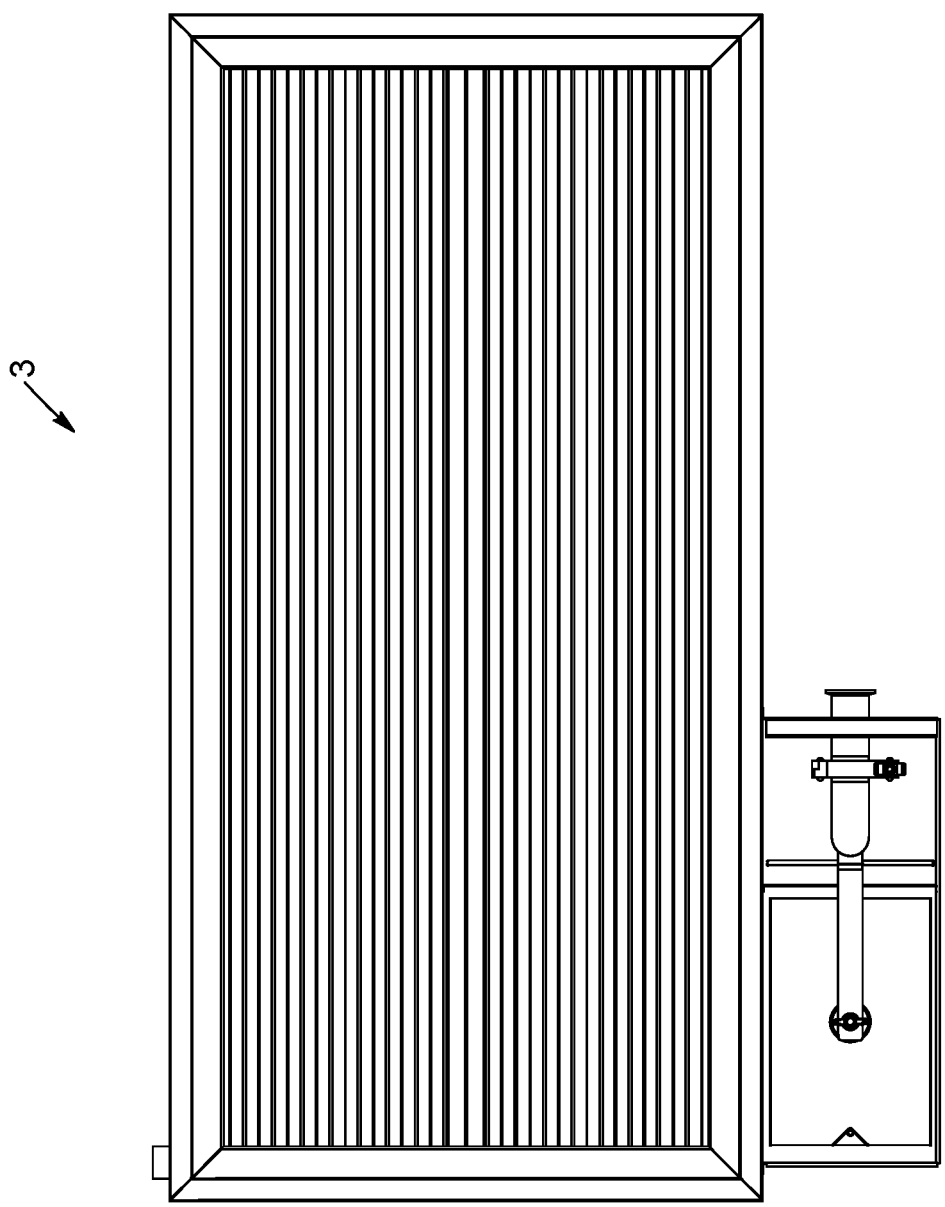
FIG. 21 is a top plan view of what is shown in FIG. 20.
Figure 22:
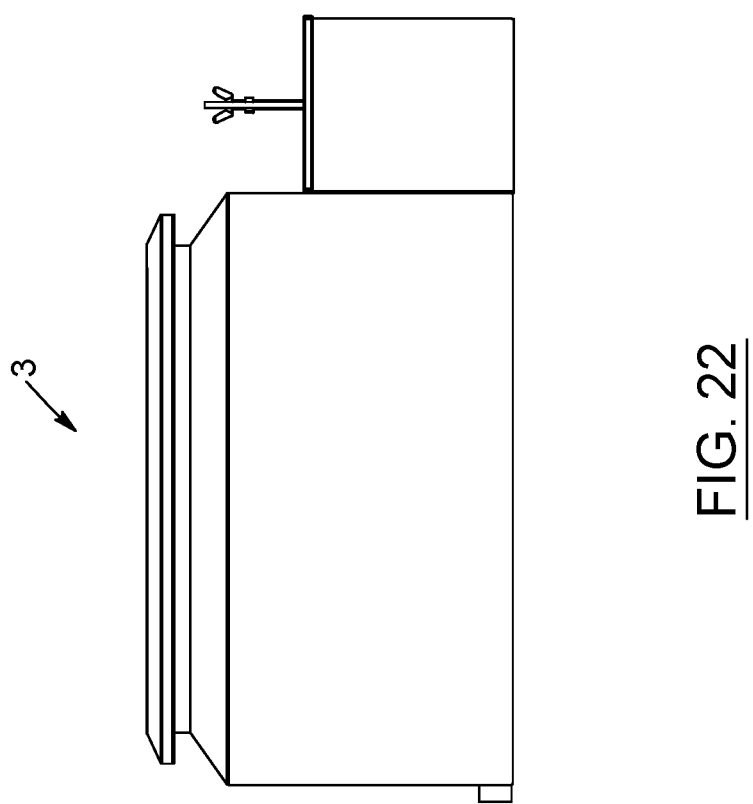
FIG. 22 is a front elevational view of what is shown in FIG. 20.
Figure 23:
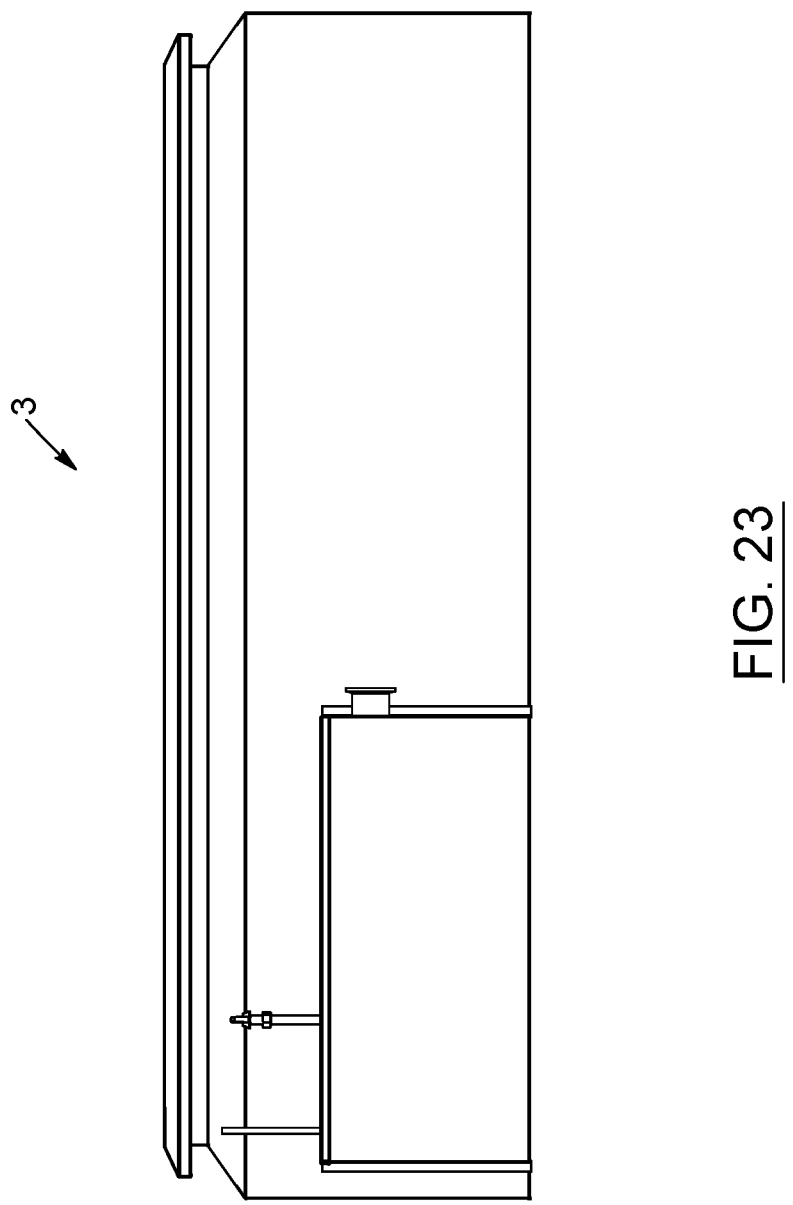
FIG. 23 is a side elevational view of what is shown in FIG. 20.
Figure 24:
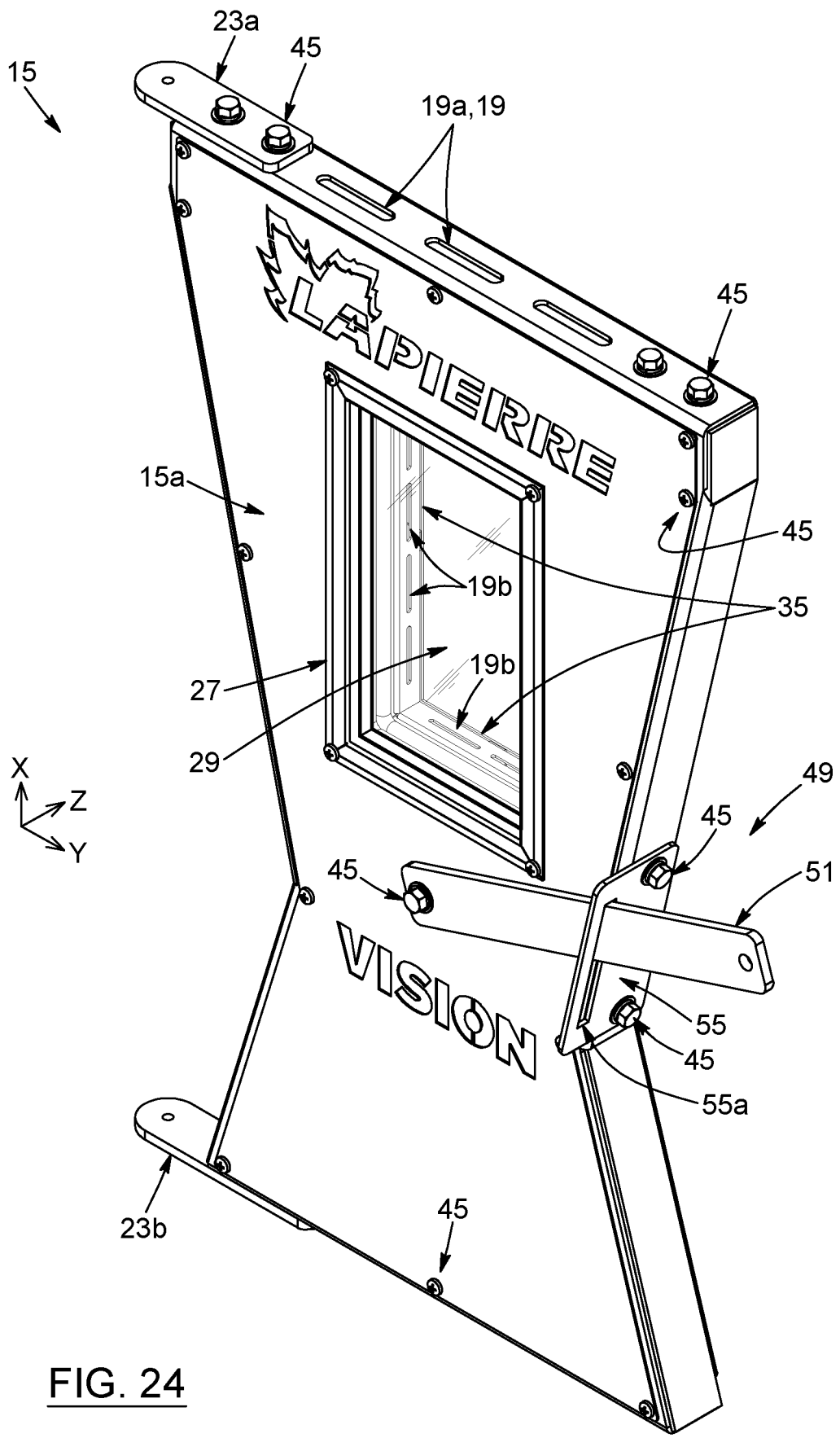
FIG. 24 is a front perspective view of a door assembly to be used with an evaporator system according to a possible embodiment of the present invention, the door assembly being shown with a latch component of a possible blocking mechanism of the door assembly operated in a raised configuration.
Figure 25:
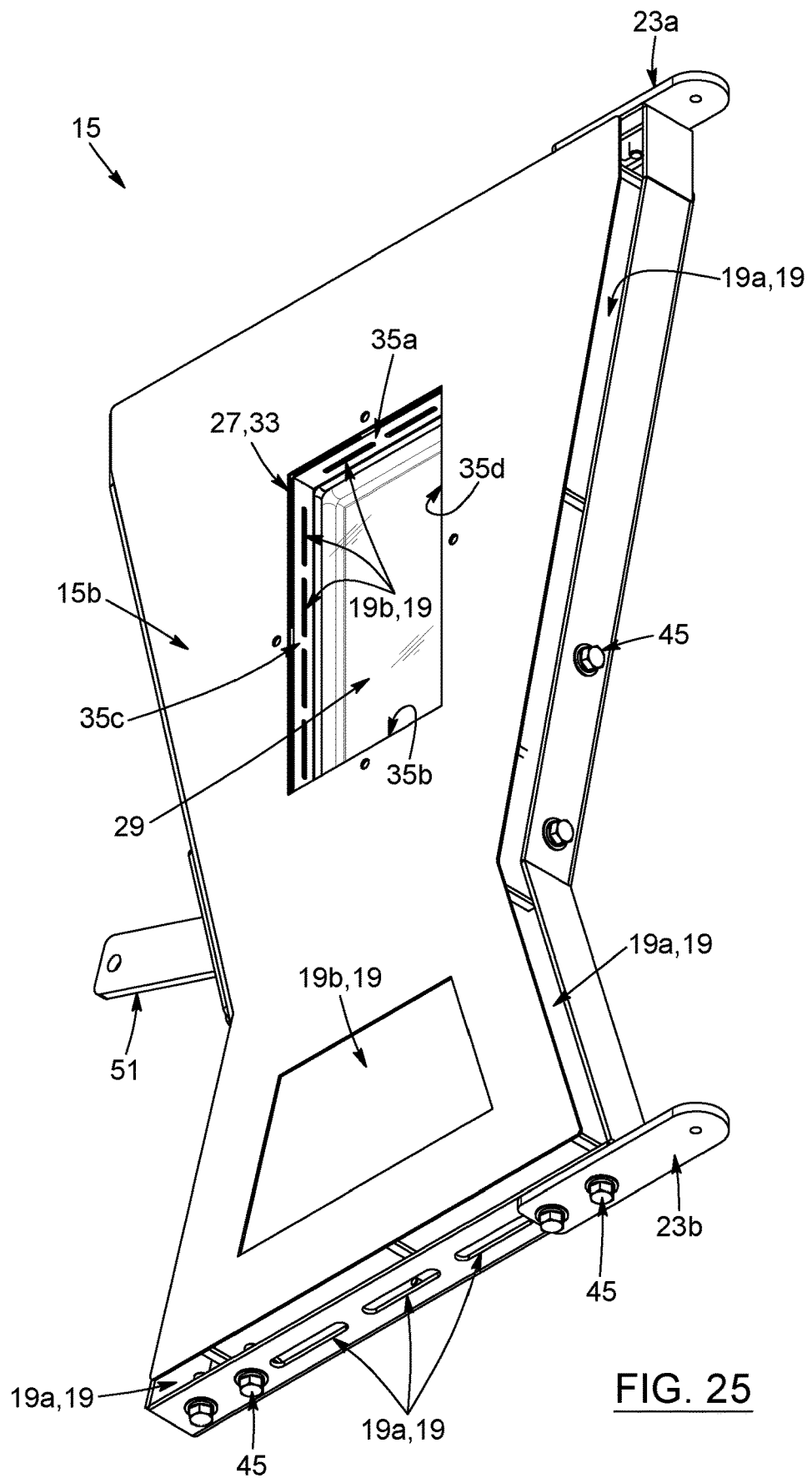
FIG. 25 is a rear perspective view of what is shown in FIG. 24.
Figure 26:
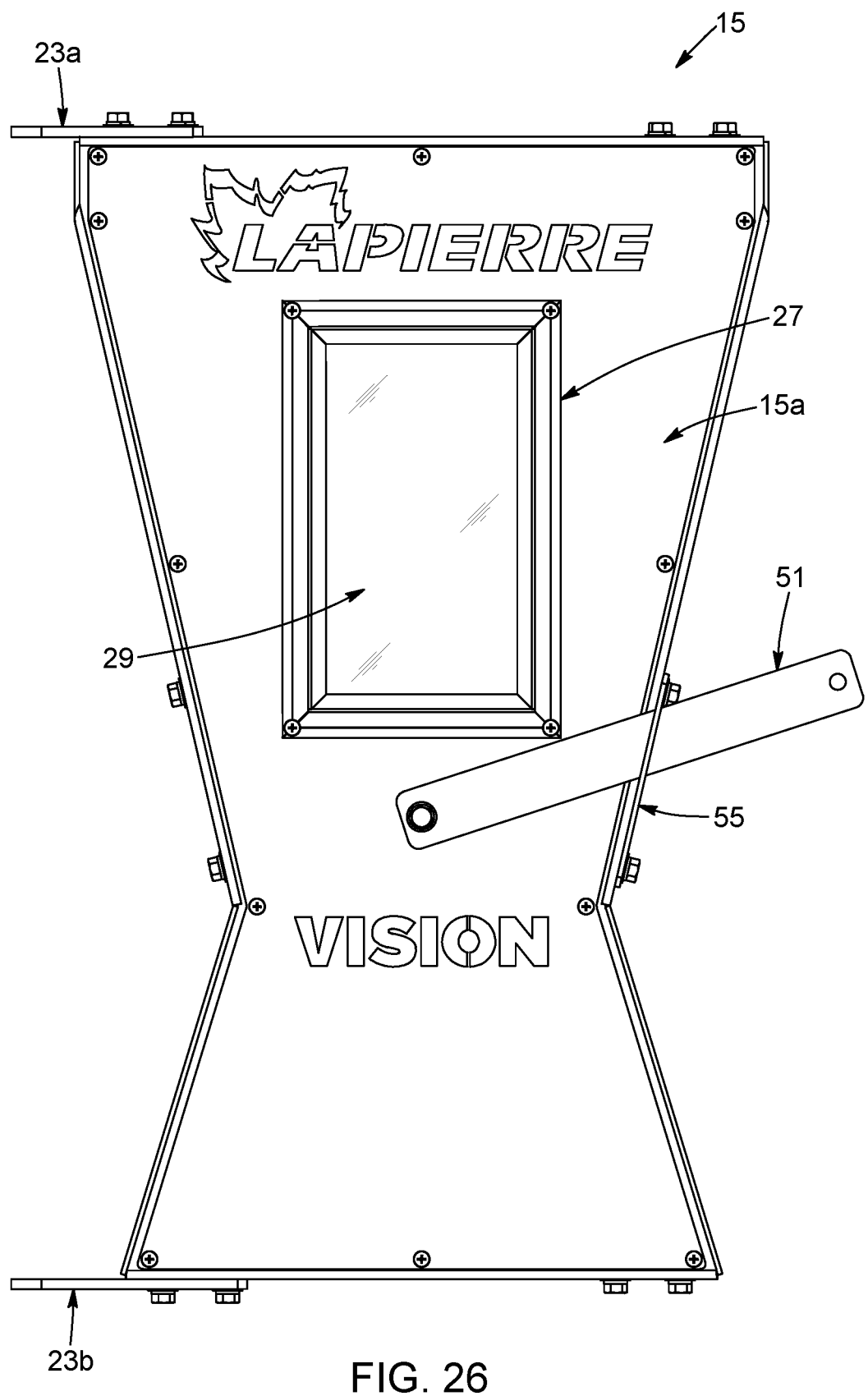

FIG. 26 a front elevational view of what is shown in FIG. 24.

Figure 27:
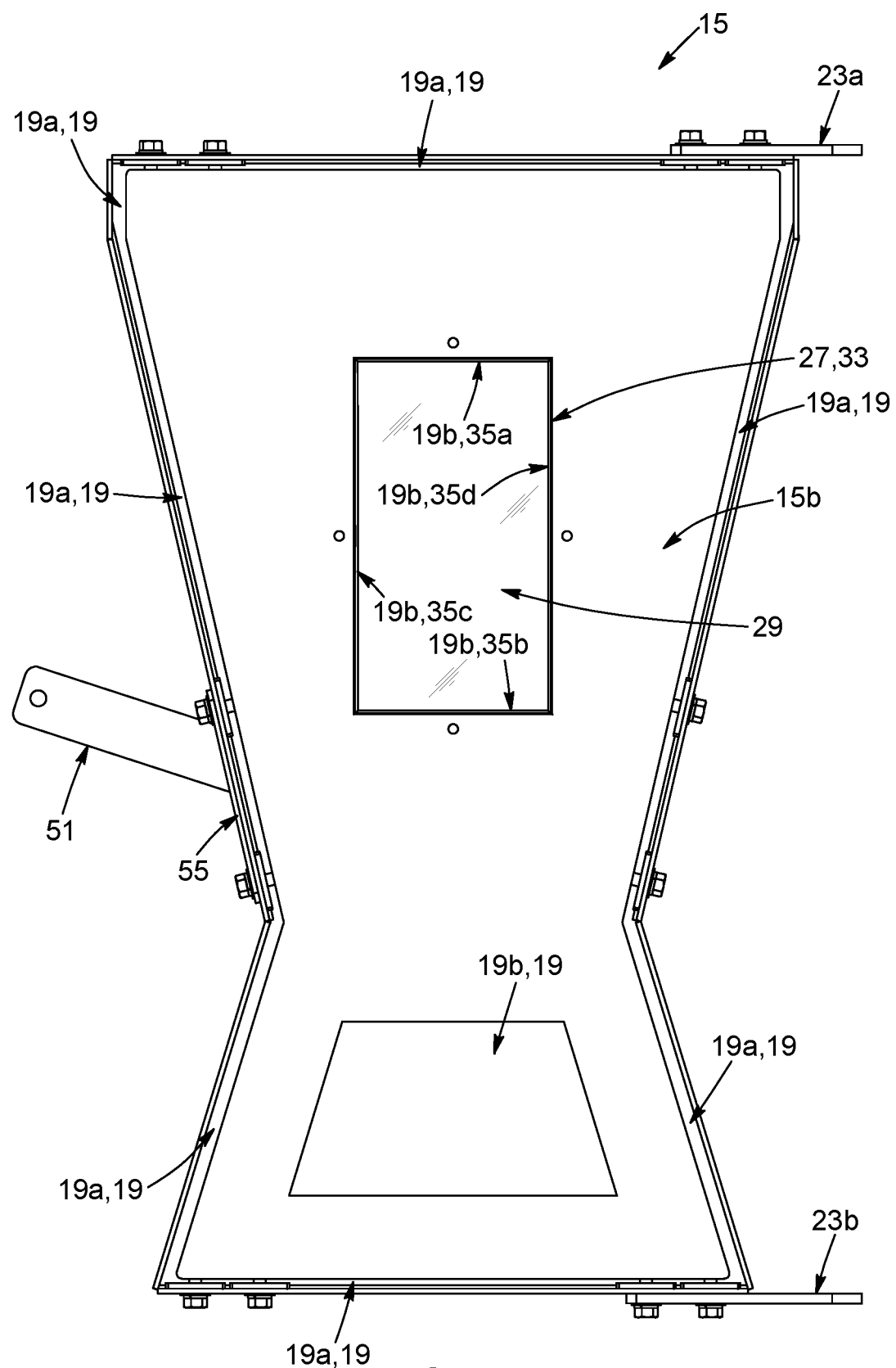

FIG. 27 is a rear elevational view of what is shown in FIG. 24.

Figure 28:
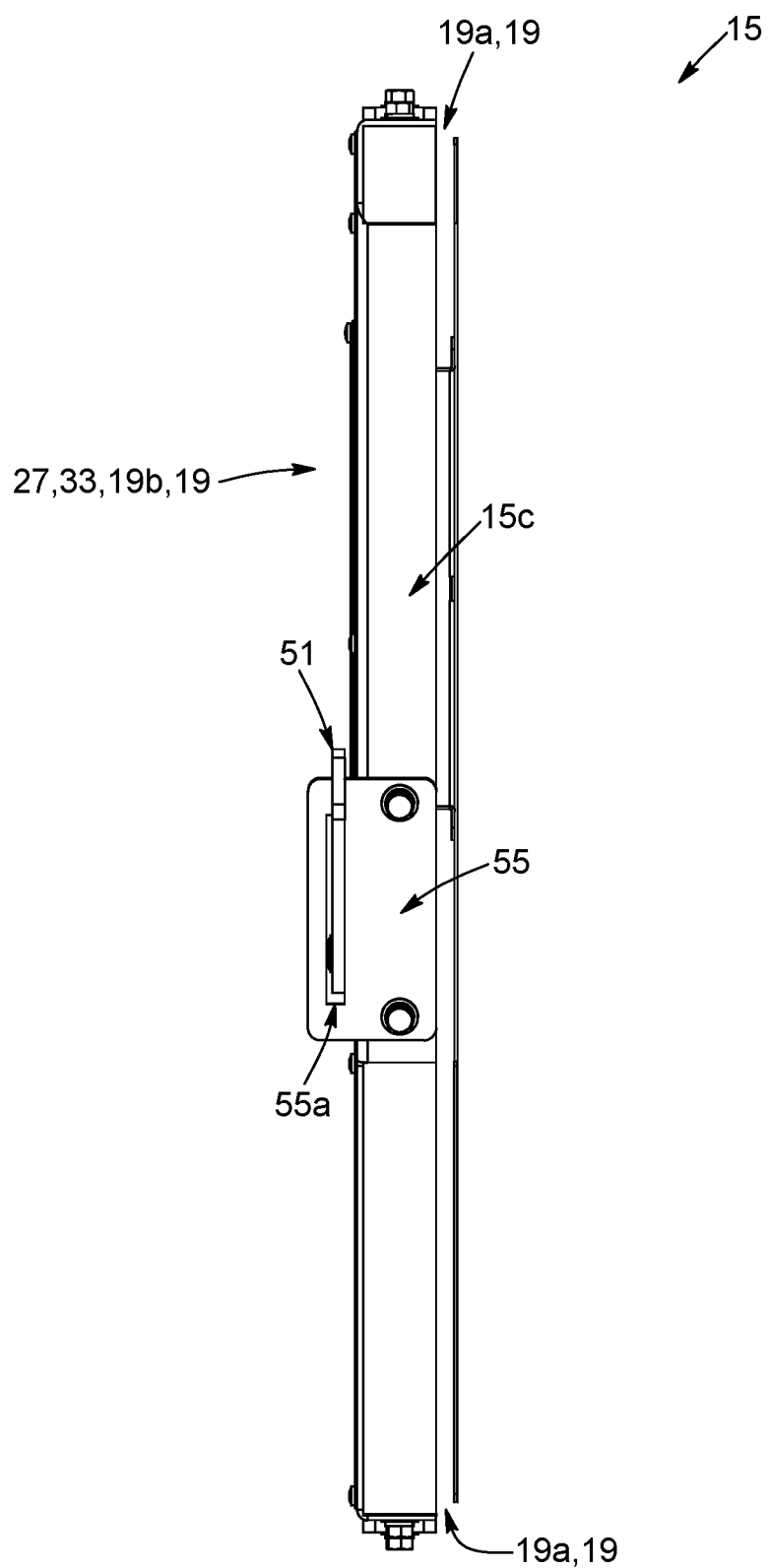

FIG. 28 is a right-side elevational view of what is shown in FIG. 24.

Figure 29:
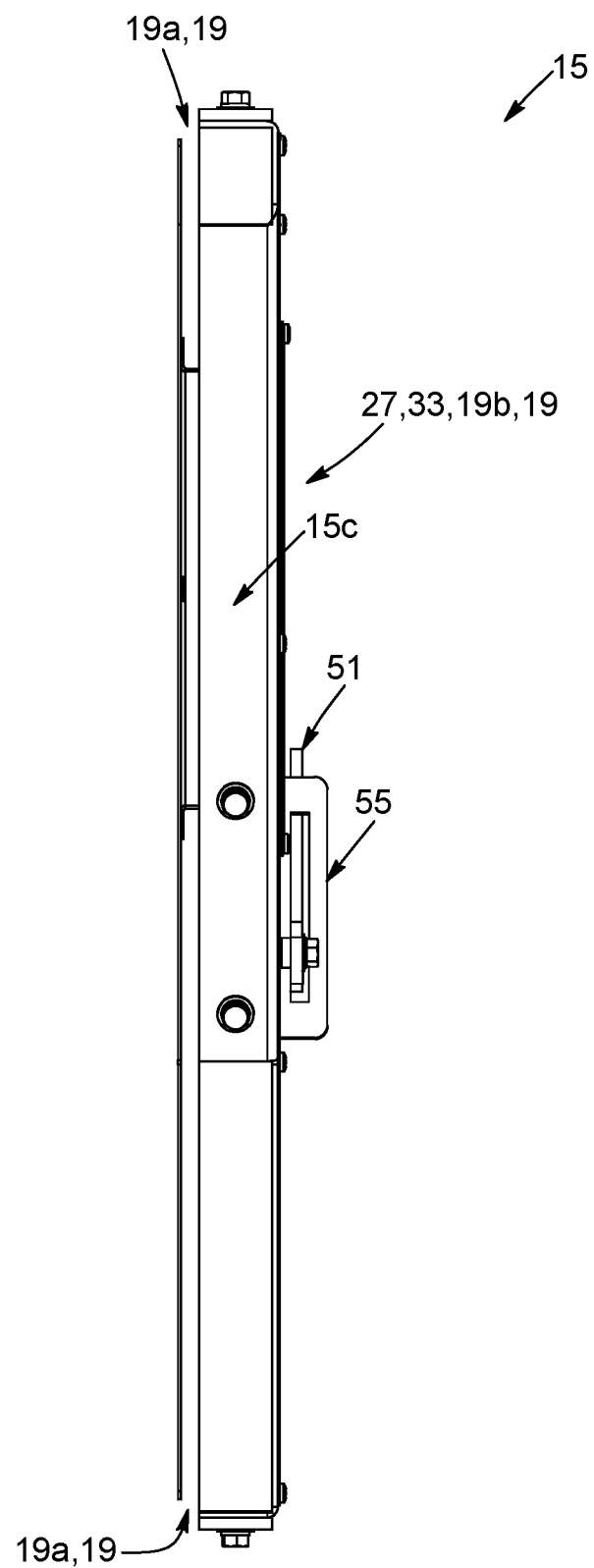

FIG. 29 is a left-side elevational view of what is shown in FIG. 24.

Figure 30:
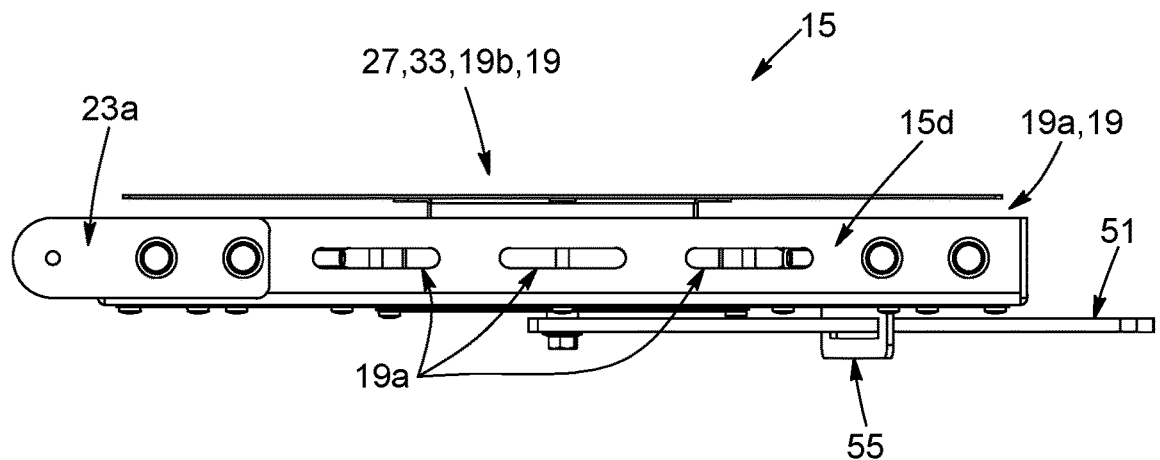

FIG. 30 is a top plan view of what is shown in FIG. 24.

Figure 31:
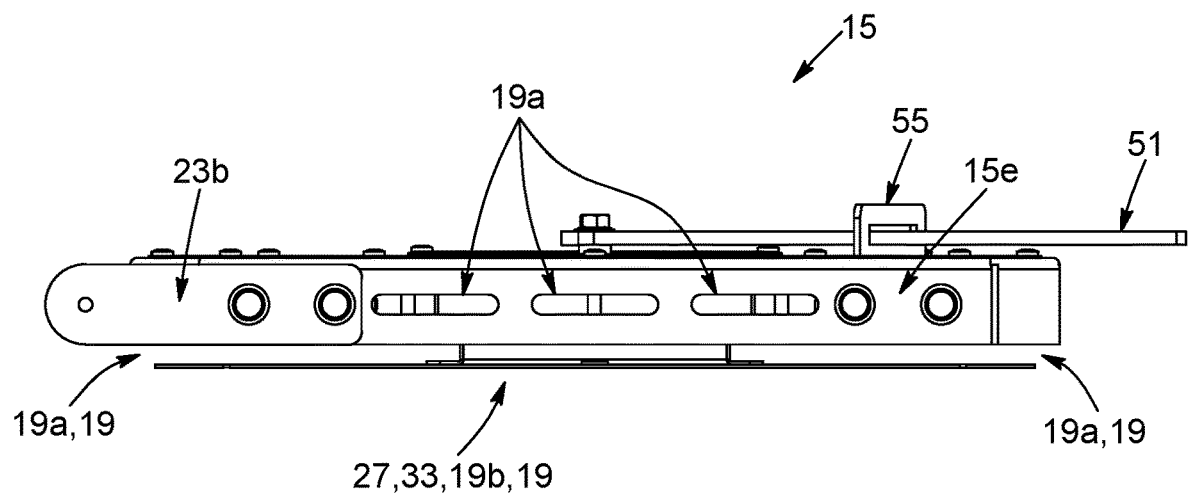

FIG. 31 is a bottom plan view of what is shown in FIG. 24.

Figure 32:
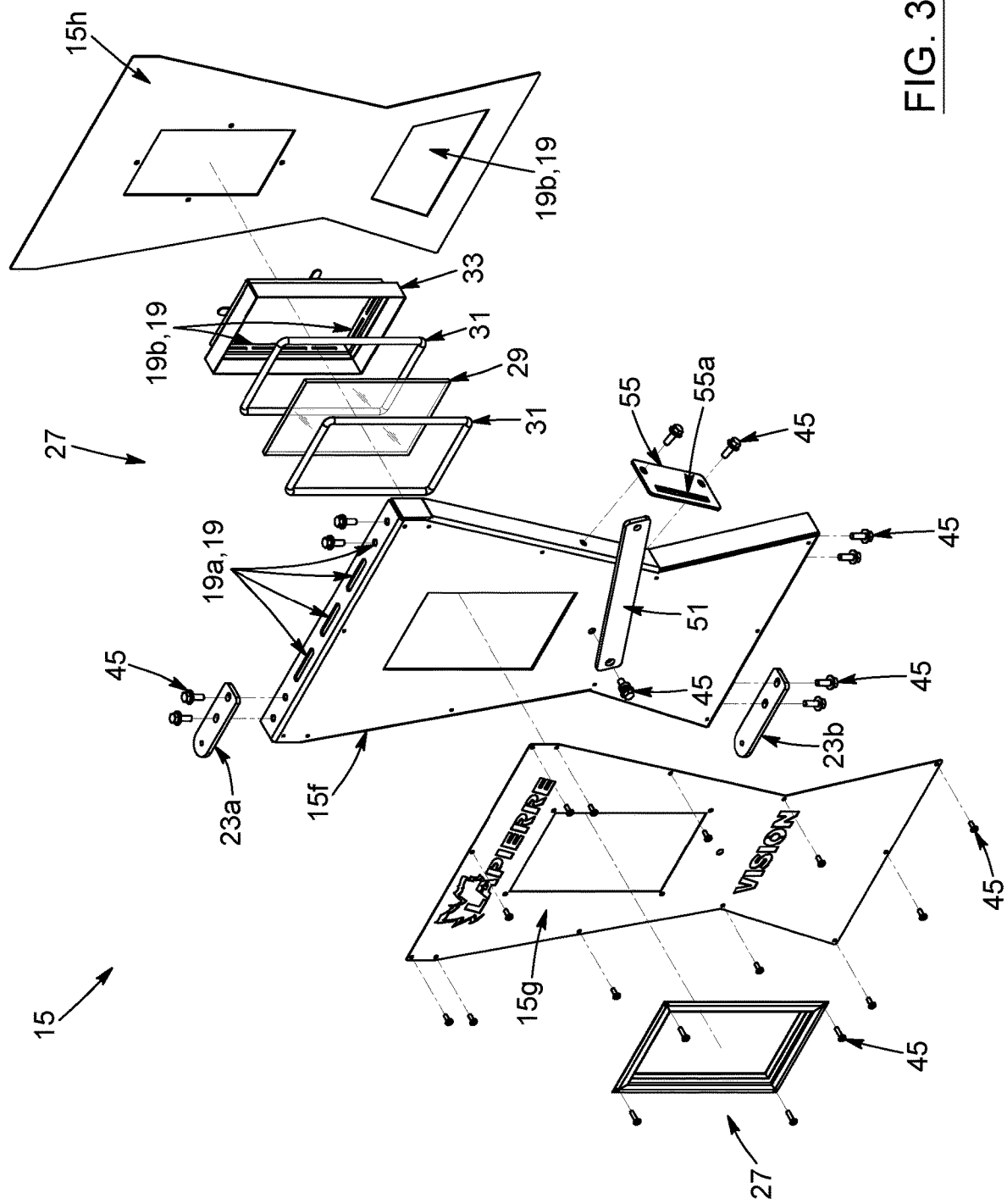

FIG. 32 is a front exploded view of what is shown in FIG. 24.

Figure 33:
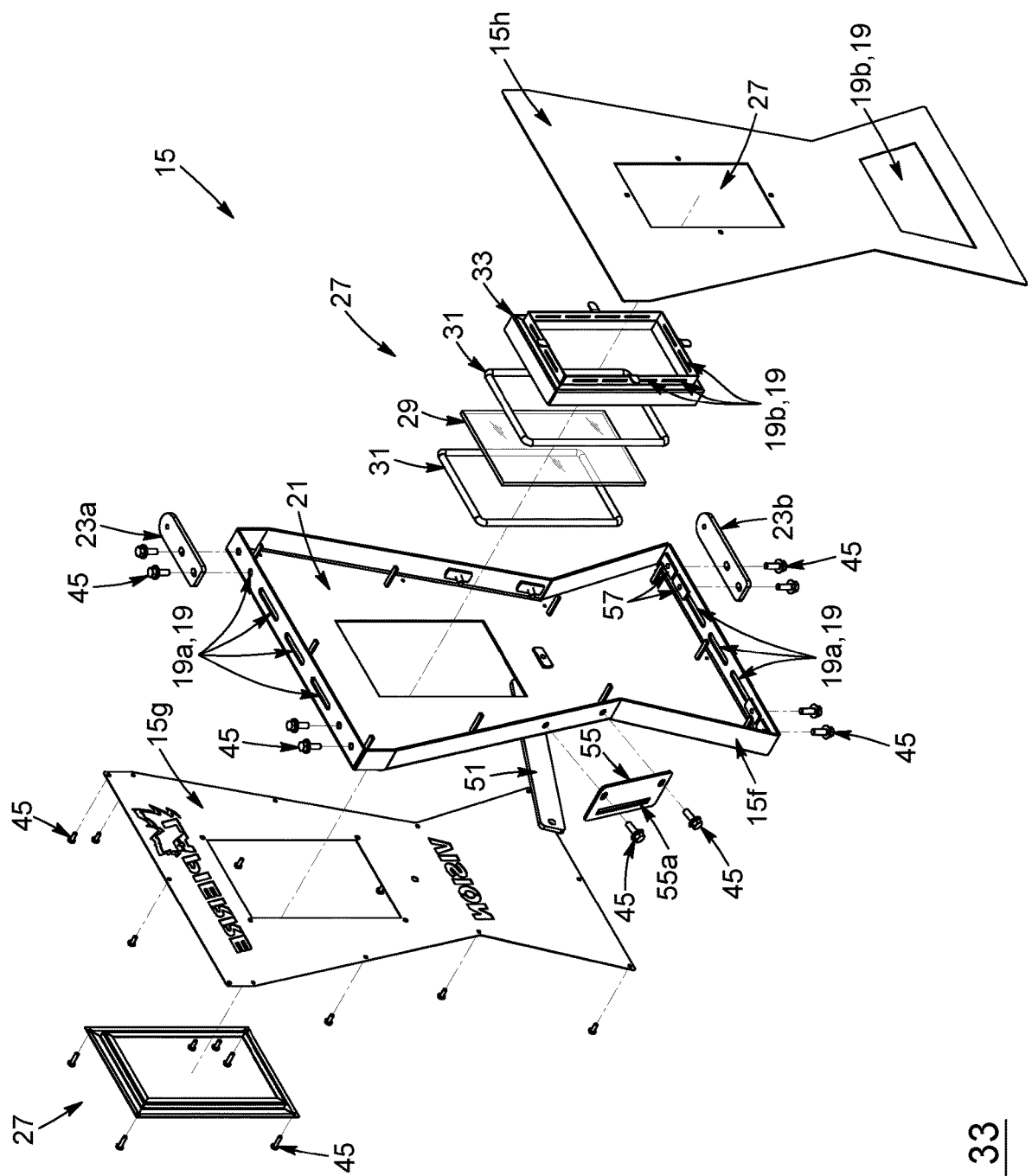

FIG. 33 is a rear exploded view of what is shown in FIG. 24.

Figure 34:
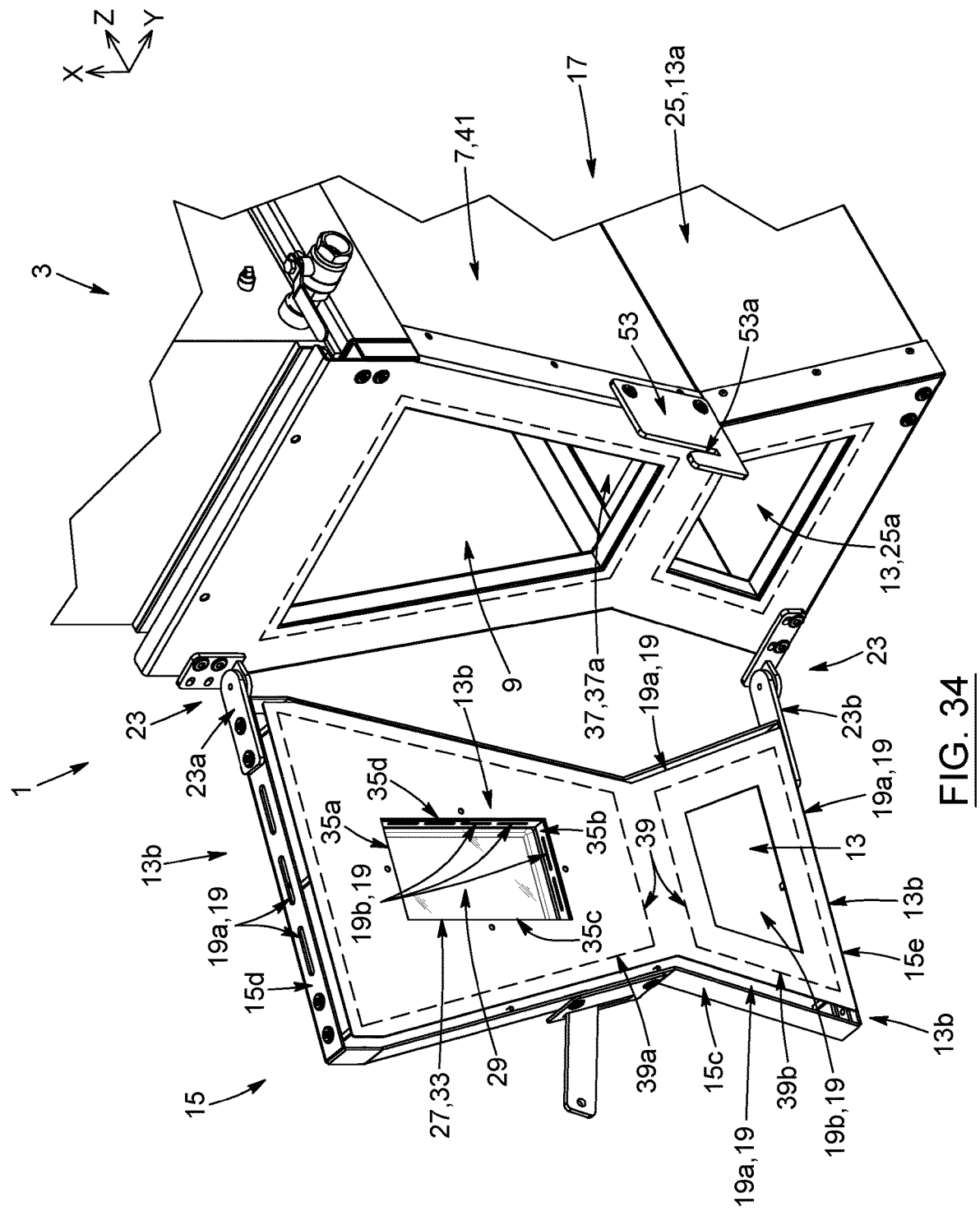

FIG. 34 is a top perspective view of the door assembly of FIG. 24 being mounted onto a corresponding evaporator system according to a possible embodiment of the present invention, the door assembly being shown in an opened configuration.

DESCRIPTION OF PREFERRED EMBODIMENTS OF THE INVENTION

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for an "evaporator" system (or simply, an "evaporator") using wood (for example) as biomass and intended to be used for syrup production purposes, such as that of maple syrup, for example, the invention may be used with any other type of system and/or for any other type of application and/or useful end, as apparent to a person skilled in the art. For this reason, expressions such as "evaporator", "biomass", "wood", "production", "syrup", "maple", etc., as used herein, and/or any other reference and/or expression equivalent or similar to these expressions should not be taken so as to limit the scope of the present invention and include any other kind of object/substitute and/or any other application with which the present invention could be used and may be useful, as apparent to a person skilled in the art.

Moreover, in the context of the present invention, expressions such as "evaporator", "door", "system", "kit", "device", "assembly", "mechanism", "product", "apparatus", "add-on", "retrofit", etc., as well as any other equivalent expression(s) and/or compound word(s) thereof, may be used interchangeably in the context of the present description, as apparent to a person skilled in the art. This applies also for any other mutually equivalent expressions, such as: a) "production", "transformation", "refinement", "caramelization", "cooking", "densifying", "modifying", etc.; b) "syrup", "fluid", "liquid", "water", "sap", "product", etc.; c) "combustion chamber", "combustion zone", "source of combustion", "source of heat", "source of thermal energy", etc.; d) "biomass", "wood", "lignocellulose material", "fuel", "combustion material", etc.; e) "exhaust gases", "combustion products", etc.; f) "detector of temperature", "thermometer", "thermocouple", "thermistor", "infrared probe", etc.; g) "controller", "command", "computer", "circuit", "hardware", "software", "program", "electric, electronic and computer components", h) "push", "pull", "flow", "bias", "differential pressure", "draft", "draught", etc.; as well as any other mutually equivalent expressions, related to the aforementioned expressions and/or to any other structural and/or functional aspects of the present invention, as also apparent to a person skilled in the art.

Furthermore, in the context of the present description, it will be considered that all elongated objects will have an implicit "longitudinal axis" or "centerline", such as the longitudinal axis of an elongated object (ex. evaporator system, door assembly, etc.), for example, or the centerline of a coiled spring, for example, and that expressions such as "connected" and "connectable", or "mounted" and "mountable", may be interchangeable, in that the present invention also relates to a kit with corresponding components for assembling a resulting fully-assembled and fully-operational evaporator system.

Moreover, components of the present system(s) and/or steps of the method(s) described herein could be modified, simplified, altered, omitted and/or interchanged, without departing from the scope of the present invention, depending on the particular application(s) which the present invention is intended for, and the desired end result(s), as briefly exemplified herein and as also apparent to a person skilled in the art.

In addition, although the preferred embodiments of the present invention as illustrated in the accompanying drawings comprise various components, and although the preferred embodiments of the present evaporator system and corresponding portion(s)/part(s)/component(s) (ex. door assembly, etc.) as shown consist of certain geometrical configurations, as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation there in between, as well as other suitable geometrical configurations may be used for the present evaporator system and corresponding portion(s)/part(s)/component(s) according to the present invention, as will be briefly explained herein and as can be easily inferred here from by a person skilled in the art, without departing from the scope of the present invention.

Broadly described, the present invention, as illustrated in the accompanying figures, relates to an improved evaporator system which, among various other advantages, enables a natural (i.e. non-forced, non-pulsated, non-driven, etc.) and/or gravity-fed introduction of secondary air into the combustion chamber thanks to an innovative door assembly being provided with a window assembly and integrated aeration holes, some of which being disposed about the window assembly, etc. The present invention also relates to a kit with corresponding components intended for assembling the same (ex. door assembly and/or evaporator system), and/or to put into practice the resulting door assembly and/or evaporator system, as well as to corresponding methods of assembling, operating and/or use associated thereto.

Furthermore, and according to a possible preferential embodiment, the present invention and associated technology and/or accessories (ex. door assembly, etc.) is known as, and commercialised under, the expression "Vision", as illustrated in the accompany drawings, which is a trademark contemplated by the Applicant/Assignee of the present case, and for which a corresponding trademark protection is also sought. Indeed, it is worth mentioning that the present invention/technology can not only be commercialized as a "resulting evaporator system", per se, but also, via the commercialization and sales of associated door assemblies and/or parts thereof only, as well.

General Overview of the "Components" and "Features" of the Present Evaporator System:
  a) mechanical assembly of the combustion chamber which ensures the total sealing in reduced pressure (for operation through the chimney's pull), and the total sealing in elevated pressure (for operation using a combustion air-supply fan);
  b) the combustion chamber is equipped with a hearth, where the fuel combustion takes place;
  c) the dimensions of the hearth are calculated and specific to the dimension(s) of the evaporator;
  d) a plenum is underneath the hearth, where the air combustion is introduced;
  e) the plenum is equipped with a regulator (ex. manual and/or other), which allows a user to regulate the air quantity in the combustion chamber by adjusting the opening of the duct;
  f) the hearth's floor is separated from the plenum with the use of grates, which allows the air to flow from the plenum to the hearth;
  g) flexible, heat-resistant seal(s) on the side of the combustion chamber that is closed by at least one pan, used to process maple sap into maple syrup;
  h) there are one or several combinations of pans:
    i) a combination pan;
    ii) one boiling pan and one syrup pan;
    iii) one boiling pan and two or more syrup pans; and/or;
    iv) two or more boiling pans and one or more syrup pans;
  i) flexible seals between the different pans used to transform the maple sap into maple syrup;
  j) a single front door, which provides access to the combustion chamber, is used to supply the evaporator with fuel, provides access to the combustion chamber for maintenance, and also provides access to the plenum;
  k) an access door with a window which covers at least 20% or more of the open passageway's area in the combustion chamber, to allow for the intake of fuel;
  l) a window used to supply combustion air into the front and top of the hearth;
  m) an access door with a combustion air duct from the plenum to the window; and/or
  n) boiling pans or combined pans, with multiple folds, allowing for a ratio of heat exchange surface to the occupied surface of the pan to be greater than 1.75.

General Overview of the "Functionalities" of the Present Evaporator System:
  a) a fuel load is positioned in the hearth of the combustion chamber and is ignited;
  b) the door is closed;

c) combustion air is introduced;
   i) by opening the plenum regulator and the chimney draught; and/or
   ii) by closing the plenum regulator and operating a fan;
d) a portion of the combustion air is supplied through the door duct from the plenum to the window either:
   i) by negative pressure in the combustion chamber, generated by the chimney draught; and/or
   ii) by positive pressure in the plenum, generated by the mechanical introduction of combustion air;
e) the amount of required combustion air is determined by the amount of energy that must be emitted by the hearth to perform the work of sap transformation;
f) the amount of combustion air is regulated by the air passage area opened by the damper;
g) part of the combustion air is supplied through the door and injected on the perimeter of the window in the combustion chamber on the front and top of the fuel;
h) the injected air on the perimeter of the window is used to complete the combustion process;
i) the energy released in the form of thermal radiation and hot gas heats the bottom of the pans—this heat is transmitted to the sap, and ensures the water evaporation and cooking of the sugar; and/or
j) the multi-fold boiling pan allows for the same level of liquid in all the pans, which allows for the use of a single liquid level control, rather than a respective level control per pan.

General Overview of the "Advantages" of the Present Evaporator System:

a) a sealed combustion chamber for evaporators with discharge of combustion products by gravity;
b) a hearth of specific dimensions that respect the following equations:
   a: surface of the hearth;
   B: surface of the pan to be boiled;
   A: total surface occupied by the pan(s);
   where for a sap with a sugar concentration of 1 to 4 of the Brix index $a = B \times A^{-0.409}$ and $a = A \times A^{-0.316}$
c) a single door which provides simultaneous access to the hearth and the plenum;
d) a single door with a ventilation duct that allows the flow of combustion air from the plenum to the injection contour of the window;
e) a door with a window that is at least 40% of the width of the opening, covered by the single door, providing access to the hearth;
f) a door with a glass panel that covers at least 20% of the surface of the hearth opening;
g) a window that serves to create a low pressure on the combustion side of the single door;
h) a low pressure on the inner surface of the combustion chamber that allows the combustion air admitted on its perimeter, to create turbulences that improve the combustion process;
i) a boiling pan or combination pan that has a ratio of heat exchange surface to occupied surface area greater than about 1.75;
j) a boiling pan and/or combination pan that allows for the same level of liquid in the evaporation section and the cooking section; and/or
k) the use of a single level control (ex. detector of water lever, floater, etc.) for all pans.

The reading of the following paragraphs, in association with the drawings, will enable to better understand how the advantages having been announced are associated with the technical novelties of the invention.

LIST OF NUMERICAL REFERENCES AND/OR OF CORRESPONDING PREFERENTIAL COMPONENTS ILLUSTRATED IN THE ENCLOSED DRAWINGS AND/OR BEING POSSIBLE FOR THE PRESENT SYSTEM 1. evaporator system
3. receptacle (ex. casserole, pan, etc.)
5. water (ex. maple water for maple syrup)
7. combustion chamber
9. inlet (of the combustion chamber)
11. evacuation port
13. air supply system (ex. for introduction combustion air, etc.)
13a. primary air (ex. supply of)
13b. secondary air (ex. supply of)
15. door assembly
15a. frontal surface (of door assembly)
15b. rearward surface (of door assembly)
15c. side lateral surface (of door assembly)
15d. top lateral surface (of door assembly)
15e. bottom lateral surface (of door assembly)
15f. intermediate frame structure (of door assembly)
15g. frontal face plate (of door assembly)
15h. rearward face plate (of door assembly)
17. support frame (of evaporator system)
19. aeration passage
19a. outer aeration hole
19b. inner aeration hole
21. hollow body portion (of door assembly)
23. hinge mechanism (of door assembly)
23a. top component (of hinge mechanism)
23b. bottom component (of hinge mechanism)
25. plenum
25a. frontal air-intake opening (of plenum)
25b. rearward air-intake opening (of plenum)
27. window assembly (of door assembly)
29. panel (ex. glass panel)
31. gasket (of window assembly)
33. window cavity (ex. recessed window cavity)
35. inner rim (of window assembly)
35a. top inner rim (of window assembly)
35b. bottom inner rim (of window assembly)
35c. side inner rim (ex. left side inner rim of window assembly)
35d. side inner rim (ex. right side inner rim of window assembly)
37. hearth
37a. grill(s) (ex. rack, etc. of hearth)
39. sealing component
39a. first sealing component
39b. second sealing component
41. temperature detector (ex. for temperature of combustion chamber)
43. adjustment mean (ex. for influx of air into combustion chamber)
45. fastener (ex. screw, bolt, pin and/or other)
47. exhaust detector (ex. for temperature of exhaust gases)
49. blocking mechanism (of door assembly)
51. latch component (of blocking mechanism)
53. catching component (of blocking mechanism)
53a. slit (of catching component)
55. guiding component (of blocking mechanism)
55a. slot (of guiding component)
57. other component (ex. bracket, washer, accessory and/or other, etc.)

The present evaporator system (1) (and the different inventive aspects thereof) can take-on different forms and/or expressions, including one and/or several of the following components and features (and/or different combination(s) and/or permutation(s) thereof), given as optional and/or preferential embodiment(s) only:

a) an evaporator system (1) used for the production of maple syrup, the evaporator system (1) comprising:
at least one receptacle (3) for receiving and processing maple water (5) destined to be transformed into maple syrup;
a combustion chamber (7) being operatively disposed with respect to said at least one receptacle (3) for providing the same with heat intended to be used in the transformation of the maple water (5) into maple syrup, the combustion chamber (7) having an inlet (9) for receiving and burning biomass inside of the combustion chamber (7);
an evacuation port (11) being operatively and fluidly connected to the combustion chamber (7) for evacuating exhaust gases from the combustion chamber (7) via a corresponding chimney;
an air supply system (13) being operatively mounted with respect to the combustion chamber (7) for feeding the same with air intended to be used in the combustion of the biomass, the air supply system (13) offering at least one type of air supply to the combustion chamber (7) selected from the group consisting of at least primary air (13a) and secondary air (13b); and
a door assembly (15) being configured for removably mounting onto a corresponding support frame (17) of the evaporator system (1), and being operable between an opened configuration for allowing access to the combustion chamber (7) and to be able to selectively feed biomass into the combustion chamber (7) via the inlet (9) thereof, and a closed configuration for preventing access to and closing off the inlet (9) of the combustion chamber (7), the door assembly (15) being provided with at least one aeration passage (19) extending between an outer portion of the door assembly (15) and an inner portion therefor, for providing a supply of secondary air (13b) to the combustion chamber (7) via said at least one aeration passage (19) of the door assembly (15) when operated in the closed configuration;

b) an evaporator system (1) according to any one of the preceding combination(s), wherein the door assembly (15) comprises a hollow body portion (21), and at least one outer aeration hole (19a) and at least one inner aeration hole (19b), the at least one outer aeration hole (19a) being positioned, shaped and sized for receiving a supply of air from outside the combustion chamber (7) when the door assembly (15) is closed onto the evaporator system (1), and the at least one inner aeration hole (19b) being positioned, shaped and sized for releasing said supply of air into the combustion chamber (7) as a supply of secondary air (13b) for the evaporator system (1) when the door assembly (15) is closed onto the evaporator system (1), the at least one outer aeration hole (19a) being fluidly connected to the at least one inner aeration hole (19b) via the hollow body portion (21) of the door assembly (15);

c) an evaporator system (1) according to any one of the preceding combination(s), wherein the at least one outer aeration hole (19a) includes at least one fontal outer aeration hole (19a) being provided about a frontal surface (15a) of the door assembly (15);

d) an evaporator system (1) according to any one of the preceding combination(s), wherein the at least one outer aeration hole (19a) includes a plurality of frontal outer aeration holes (19a) being provided about the frontal surface (15a) of the door assembly (15);

e) an evaporator system (1) according to any one of the preceding combination(s), wherein the frontal outer aeration holes (19a) are separate from one another;

f) an evaporator system (1) according to any one of the preceding combination(s), wherein the frontal outer aeration holes (19a) include circular frontal outer aeration holes (19a), with each circular frontal outer aeration hole (19a) having a given diameter (d);

g) an evaporator system (1) according to any one of the preceding combination(s), wherein the frontal outer aeration holes (19a) include square frontal outer aeration holes (19a), with each square frontal outer aeration hole (19a) having a given side length (l);

h) an evaporator system (1) according to any one of the preceding combination(s), wherein the frontal outer aeration holes (19a) include oblong frontal outer aeration holes (19a), with each oblong frontal outer aeration hole (19a) having a given length (l) being longer than a given width (w) thereof;

i) an evaporator system (1) according to any one of the preceding combination(s), wherein the oblong frontal outer aeration holes (19a) are orientated such that the lengths (l) thereof are parallel to a given upright direction (X) of the door assembly (15);

j) an evaporator system (1) according to any one of the preceding combination(s), wherein the oblong frontal outer aeration holes (19a) are orientated such that the lengths (l) thereof are parallel to a given transversal direction (Y) of the door assembly (15);

k) an evaporator system (1) according to any one of the preceding combination(s), wherein the oblong frontal outer aeration holes (19a) are orientated such that the lengths (l) thereof are slanted with respect to a given orthogonal (X,Y,Z) direction of the door assembly (15);

l) an evaporator system (1) according to any one of the preceding combination(s), wherein the at least one outer aeration hole (19a) includes at least one lateral outer aeration hole (19a) being provided about a lateral surface (15a,15b,15c,15d,15e) of the door assembly (15);

m) an evaporator system (1) according to any one of the preceding combination(s), wherein the at least one outer aeration hole (19a) includes a plurality of lateral outer aeration holes (19a) being provided about the lateral surface (15a,15b,15c,15d,15e) of the door assembly (15);

n) an evaporator system (1) according to any one of the preceding combination(s), wherein the lateral outer aeration holes (19a) include at least one lateral outer aeration hole (19a) being provided about a top lateral surface (15d) of the door assembly (15);

o) an evaporator system (1) according to any one of the preceding combination(s), wherein the lateral outer aeration holes (19a) include at least one lateral outer aeration hole (19a) being provided about a bottom lateral surface (15e) of the door assembly (15);

p) an evaporator system (1) according to any one of the preceding combination(s), wherein the lateral outer aeration holes (19a) include at least one lateral outer aeration hole (19a) being provided about a side lateral surface (15c) of the door assembly (15);

q) an evaporator system (1) according to any one of the preceding combination(s), wherein the lateral outer aeration holes (19*a*) are separate from one another;
r) an evaporator system (1) according to any one of the preceding combination(s), wherein the lateral outer aeration holes (19*a*) include circular lateral outer aeration holes (19*a*), with each circular lateral outer aeration hole (19*a*) having a given diameter (d);
s) an evaporator system (1) according to any one of the preceding combination(s), wherein the lateral outer aeration holes (19*a*) include square lateral outer aeration holes (19*a*), with each square lateral outer aeration hole (19*a*) having a given side length (l);
t) an evaporator system (1) according to any one of the preceding combination(s), wherein the lateral outer aeration holes (19*a*) include oblong lateral outer aeration holes (19*a*), with each oblong lateral outer aeration hole (19) having a given length (l) being longer than a given width (w) thereof;
u) an evaporator system (1) according to any one of the preceding combination(s), wherein the oblong lateral outer aeration holes (19*a*) are orientated such that the lengths thereof are parallel to a given transversal direction (Y) of the door assembly (15);
v) an evaporator system (1) according to any one of the preceding combination(s), wherein the oblong lateral outer aeration holes (19*a*) are orientated such that the lengths thereof are parallel to a given longitudinal direction (Z) of the door assembly (15);
w) an evaporator system (1) according to any one of the preceding combination(s), wherein the oblong lateral outer aeration holes (19*a*) are orientated such that the lengths (l) thereof are slanted with respect to a given orthogonal direction (X,Y,Z) of the door assembly (15);
x) an evaporator system (1) according to any one of the preceding combination(s), wherein the lateral outer aeration holes (19*a*) include a plurality of top lateral outer aeration holes (19*a*) being provided about a top lateral edge of the door assembly (15);
y) an evaporator system (1) according to any one of the preceding combination(s), wherein one of said top lateral outer aeration holes (19*a*) is further positioned, shaped and sized for removably and selectively receiving a top component (23*a*) of a hinge mechanism (23) of the door assembly (15), via at least one corresponding fastener (45);
z) an evaporator system (1) according to any one of the preceding combination(s), wherein the lateral outer aeration holes (19*a*) include a plurality of bottom lateral outer aeration holes (19*a*) being provided about a bottom lateral edge of the door assembly (15);
aa) an evaporator system (1) according to any one of the preceding combination(s), wherein one of said bottom lateral outer aeration holes (19*a*) is further positioned, shaped and sized for removably and selectively receiving a bottom component (23*b*) of the hinge mechanism (23) of the door assembly (15), via at least one corresponding fastener (45);
bb) an evaporator system (1) according to any one of the preceding combination(s), wherein the at least one outer aeration hole (19*a*) includes at least one rearward outer aeration hole (19*a*) being provided about a rearward surface (15*b*) of the door assembly (15);
cc) an evaporator system (1) according to any one of the preceding combination(s), wherein the at least one rearward outer aeration hole (19*a*) extends along a corresponding peripheral edge of the rearward surface (15*b*) of the door assembly (15);
dd) an evaporator system (1) according to any one of the preceding combination(s), wherein the at least one rearward outer aeration hole (19*a*) extends along at least a top peripheral edge of the rearward surface (15*b*) of the door assembly (15);
ee) an evaporator system (1) according to any one of the preceding combination(s), wherein the at least one rearward outer aeration hole (19*a*) extends along at least a bottom peripheral edge of the rearward surface (15*b*) of the door assembly (15);
ff) an evaporator system (1) according to any one of the preceding combination(s), wherein the at least one rearward outer aeration hole (19*a*) extends along at least one side peripheral edge of the rearward surface (15*b*) of the door assembly (15);
gg) an evaporator system (1) according to any one of the preceding combination(s), wherein the at least one rearward outer aeration hole (19*a*) extends along at least a pair of opposite side peripheral edges of the rearward surface (15*b*) of the door assembly (15);
hh) an evaporator system (1) according to any one of the preceding combination(s), wherein the at least one rearward outer aeration hole (19*a*) extends along a complete circumferential peripheral edge of the rearward surface (15*b*) of the door assembly (15);
ii) an evaporator system (1) according to any one of the preceding combination(s), wherein the at least one rearward outer aeration hole (19*a*) is a circumferential peripheral rearward outer aeration channel (19*a*);
jj) an evaporator system (1) according to any one of the preceding combination(s), wherein the at least one inner aeration hole (19*b*) includes at least one bottom rearward inner aeration hole (19*b*) being provided about a bottom portion of the rearward surface (15*b*) of the door assembly (15), said at least one bottom rearward inner aeration hole (19*b*) being positioned, shaped and sized so as to be fluidly connectable to a corresponding plenum (25) of the evaporator system (1) when the door assembly (15) is operated in the closed configuration;
kk) an evaporator system (1) according to any one of the preceding combination(s), wherein the at least one bottom rearward inner aeration hole (19*b*) has a geometrical profile being complementary to a corresponding opening of the plenum (25) of the evaporator system (1);
ll) an evaporator system (1) according to any one of the preceding combination(s), wherein the door assembly (15) comprises opposite top and bottom portions delimited by a corresponding intermediate section;
mm) an evaporator system (1) according to any one of the preceding combination(s), wherein the top and bottom portions of the door assembly (15) each have a substantially trapezoidal profile, and wherein a narrowest width portion of the door assembly (15) extends along the intermediate section of the door assembly (15);
nn) an evaporator system (1) according to any one of the preceding combination(s), wherein the door assembly (15) is provided with a window assembly (27) extending between frontal and rearward surfaces (15*a*,15*b*) of the door assembly (15), the window assembly (27) being provided with a least one glass panel (29) for allowing a user of the evaporator system (1) to visualize the content of the combustion chamber (7) when the door assembly (15) is closed onto the evaporator system (1);

oo) an evaporator system (1) according to any one of the preceding combination(s), wherein the window assembly (27) further comprises at least one gasket (31) for cooperating with said at least one glass panel (29);

pp) an evaporator system (1) according to any one of the preceding combination(s), wherein the at least one inner aeration hole (19b) is provided about the rearward surface (15b) of the door assembly (15), adjacent to the window assembly (27);

qq) an evaporator system (1) according to any one of the preceding combination(s), wherein the window assembly (27) is positioned, shaped and sized about the door assembly (15) so as to define a recessed window cavity (33) about the rearward surface (15b) of the door assembly (15), and within a main body portion of the door assembly (15);

rr) an evaporator system (1) according to any one of the preceding combination(s), wherein at least one inner aeration hole (19b) includes at least one corresponding inner aeration hole (19b) being provided about a corresponding inner rim (35) of the recessed window cavity (33);

ss) an evaporator system (1) according to any one of the preceding combination(s), wherein the at least one inner aeration hole (19b) includes at least one window-top inner aeration hole (19b) being provided about a top inner rim (35a) of the recessed window cavity (33);

tt) an evaporator system (1) according to any one of the preceding combination(s), wherein the at least one inner aeration hole (19b) includes at least one window-bottom inner aeration hole (19b) being provided about a bottom inner rim (35b) of the recessed window cavity (33);

uu) an evaporator system (1) according to any one of the preceding combination(s), wherein the at least one inner aeration hole (19b) includes at least one window-side inner aeration hole (19b) being provided about a side inner rim (35c,35d) of the recessed window cavity (33);

vv) an evaporator system (1) according to any one of the preceding combination(s), wherein the at least one inner aeration hole (19b) includes at least one pair of window-side inner aeration holes (19b) being provided about a pair of opposite side inner rims (35c,35d) of the recessed window cavity (33);

ww) an evaporator system (1) according to any one of the preceding combination(s), wherein the at least one inner aeration hole (19b) includes a plurality of different inner aeration holes (19b);

xx) an evaporator system (1) according to any one of the preceding combination(s), wherein the inner aeration holes (19b) are separate from one another;

yy) an evaporator system (1) according to any one of the preceding combination(s), wherein the inner aeration holes (19b) include circular inner aeration holes (19b), with each circular inner aeration hole (19b) having a given diameter (d);

zz) an evaporator system (1) according to any one of the preceding combination(s), wherein the inner aeration holes (19b) include square inner aeration holes (19b), with each square inner aeration hole (19b) having a given side length (l);

aaa) an evaporator system (1) according to any one of the preceding combination(s), wherein the inner aeration holes (19b) include oblong inner aeration holes (19b), with each oblong inner aeration hole (19b) having a given length (l) being longer than a given width (w) thereof;

bbb) an evaporator system (1) according to any one of the preceding combination(s), wherein the oblong inner aeration holes (19b) are orientated such that the lengths thereof are parallel to a given transversal direction (Y) of the door assembly (15);

ccc) an evaporator system (1) according to any one of the preceding combination(s), wherein the oblong inner aeration holes (19b) are orientated such that the lengths (l) thereof are parallel to a given longitudinal (Z) direction of the door assembly (15);

ddd) an evaporator system (1) according to any one of the preceding combination(s), wherein the oblong inner aeration holes (19b) are orientated such that the lengths (l) thereof are slanted with respect to a given orthogonal direction (X,Y,Z) of the door assembly (15);

eee) an evaporator system (1) according to any one of the preceding combination(s), wherein the oblong inner aeration holes (19b) are provided about at least opposite top and bottom inner rims (35a,35b) of the recessed window cavity (33);

fff) an evaporator system (1) according to any one of the preceding combination(s), wherein the oblong inner aeration holes (19b) are provided about at least opposite left and right inner rims (35c,35d) of the recessed window cavity (33);

ggg) an evaporator system (1) according to any one of the preceding combination(s), wherein the recessed window cavity (33) and associated at least one glass panel (29) of the window assembly (27) are substantially rectangular, and are provided with a corresponding operative height (h) and a corresponding operative width (w);

hhh) an evaporator system (1) according to any one of the preceding combination(s), wherein the operative width (w) of the recessed window cavity (33) corresponds to at least 40% of a corresponding width (w) of the inlet (9) of the combustion chamber (7);

iii) an evaporator system (1) according to any one of the preceding combination(s), wherein the recessed window cavity (33) includes an operative viewing surface (A) corresponding to at least 20% of a biomass-receiving surface of a corresponding hearth (37) associated to the evaporator system (1);

jjj) an evaporator system (1) according to any one of the preceding combination(s), wherein the evaporator system (1) is configured so that the combustion chamber (7) is substantially sealed when the door assembly (15) is operated into the closed configuration;

kkk) an evaporator system (1) according to any one of the preceding combination(s), wherein a first sealing component (39a) is provided about the rearward surface (15b) of the door assembly (15), and around the recess window cavity (33) thereof, said first sealing component (39a) being positioned, shaped and sized for sealing off the inlet (9) of the combustion chamber (7) when the door assembly (15) is closed off onto the evaporator system (1);

lll) an evaporator system (1) according to any one of the preceding combination(s), wherein the first sealing component (39a) is made of a substantially flexible and heat-resistant material;

mmm) an evaporator system (1) according to any one of the preceding combination(s), wherein a second sealing component (39b) is provided about the rearward surface (15b) of the door assembly (15), and around a bottom rearward inner aeration hole (19b) thereof, said second sealing component (39b) being positioned, shaped and sized for sealing off the plenum (25) of the combustion chamber (7) when the door assembly (15) is closed off onto the evaporator system (1);

nnn) an evaporator system (1) according to any one of the preceding combination(s), wherein the second sealing component (39b) is made of a substantially flexible and heat-resistant material;

ooo) an evaporator system (1) according to any one of the preceding combination(s), wherein the evaporator system (1) comprises a plenum (25) being operatively disposed below the combustion chamber (7) and being fluidly connected to said combustion chamber (7) for providing the combustion chamber (7) with a supply of primary air (13a);

ppp) an evaporator system (1) according to any one of the preceding combination(s), wherein a hearth (37) is operatively disposed between the combustion chamber (7) and the plenum (25);

qqq) an evaporator system (1) according to any one of the preceding combination(s), wherein the hearth (37) includes corresponding grills (37a) to allow a passage of air from the plenum (25) to the combustion chamber (7);

rrr) an evaporator system (1) according to any one of the preceding combination(s), wherein the door assembly (15) is positioned, shaped and sized so that at least one inner aeration hole (19b) of the door assembly (15) is positioned adjacent to the hearth (37), when the door assembly (15) is closed off onto the evaporator system (1), in order to provide the combustion chamber (7) with a given influx of air (13b) (ex. primary air and/or secondary air);

sss) an evaporator system (1) according to any one of the preceding combination(s), wherein the door assembly (15) is positioned, shaped and sized so that at least one bottom inner aeration hole (19b) of the door assembly (15) is positioned at a first given operative level adjacent to the hearth (37), when the door assembly (15) is closed off onto the evaporator system (1), in order to provide the combustion chamber (7) with a given bottom influx of secondary air (13b);

ttt) an evaporator system (1) according to any one of the preceding combination(s), wherein the door assembly (15) is positioned, shaped and sized so that at least one top inner aeration hole (19b) of the door assembly (15) is positioned at a second given operative level above the hearth (37), when the door assembly (15) is closed off onto the evaporator system (1), in order to provide the combustion chamber (7) with a given top influx of secondary air (13b);

uuu) an evaporator system (1) according to any one of the preceding combination(s), wherein the at least one bottom inner aeration hole (19b) of the door assembly (15) is provided about a bottom inner rim (35b) of the recessed window cavity (33), and wherein the at least one top inner aeration hole (19b) of the door assembly (15) is provided about a top inner rim (35a) of the recessed window cavity (33);

vvv) an evaporator system (1) according to any one of the preceding combination(s), wherein the operative height (h) of the recessed window cavity (33) is further configured to act as a visual aid for a user of the evaporator system (1), in terms of biomass to be introduced into the combustion chamber (7), with optimal levels of biomass in the combustion chamber (7) corresponding to heights of biomass being present within a range of the first and second given operative levels, associated with corresponding bottom and top levels of the operative height (h) of the recessed window cavity (33);

www) an evaporator system (1) according to any one of the preceding combination(s), wherein separate inner aeration holes (19b) of the door assembly (15) positioned at different locations and levels in order to create turbulent air flows about the window cavity (33), when the door assembly (15) is closed off onto the evaporator system (1), in order to aid with the combustion of the biomass inside the combustion chamber (7);

xxx) an evaporator system (1) according to any one of the preceding combination(s), wherein the door assembly (15) is positioned, shaped and sized so that at least one top inner aeration hole (19b) of the door assembly (15) is positioned above of the hearth (37);

yyy) an evaporator system (1) according to any one of the preceding combination(s), wherein the plenum (25) has a frontal air-intake opening (25a) provided about a front portion of the support frame (17) of the evaporator system (1);

zzz) an evaporator system (1) according to any one of the preceding combination(s), wherein the door assembly (15) of the evaporator system (1) is further positioned, shaped and sized so that the frontal air-intake opening (25a) of the plenum (25) is exposed and accessible when the door assembly (15) is operated in the opened configuration, and so that said frontal air-intake opening (25a) of the plenum (25) is closed off by the door assembly (15) when operated in the closed configuration;

aaaa) an evaporator system (1) according to any one of the preceding combination(s), wherein the door assembly (15) of the evaporator system (1) is further positioned, shaped and sized so that said frontal air-intake opening (25a) of the plenum (25) be fluidly connectable to a corresponding inner aeration hole (19b) of the door assembly (15) when the door assembly (15) is operated in the closed configuration;

bbbb) an evaporator system (1) according to any one of the preceding combination(s), wherein the plenum (25) has a rearward air-intake opening (25b) provided about a rearward portion of the support frame (17) of the evaporator system (1), said rearward air-intake opening (25b) of the plenum (25) being selectively operable and adjustable to provide the combustion chamber (7) with a supply of primary air (13a);

cccc) an evaporator system (1) according to any one of the preceding combination(s), wherein the at least one receptacle (3) includes a bottom section having plurality of segmented sections, said plurality of segmented sections having an exposed surface for heat transfer with the combustion chamber (7), as well a spanning surface extending longitudinally along the evaporator system (1), the ratio of the exposed surface and the spanning surface being greater than about 1.75;

dddd) an evaporator system (1) according to any one of the preceding combination(s), wherein the at least one receptacle (3) is selected from the group consisting of an evaporation receptacle (3), a cooking receptacle (3) and a combined receptacle (3);

eeee) an evaporator system (1) according to any one of the preceding combination(s), wherein the hearth (37) has dimensions in accordance with a formula defined by $a=B \times A^{-0.409}$ and $a=A \times A^{-0.316}$, where:

a=surface of the hearth (37);

B=surface of a boiling portion of the at least one receptable; and

A=total surface occupied by the at least one receptable;

ffff) an evaporator system (1) according to any one of the preceding combination(s), wherein the evaporator system (1) includes a detector (41) of temperature being operatively connected to the combustion chamber (7) for determining an operating temperature inside of the combustion chamber (7);

gggg) an evaporator system (1) according to any one of the preceding combination(s), wherein the air supply system (13) offering at least one type of air supply to the combustion chamber (7) is provided with at least one corresponding modulating adjustment mean (43) for selectively controlling a corresponding influx of air into the combustion chamber (7);

hhhh) an evaporator system (1) according to any one of the preceding combination(s), wherein the air supply system (13) includes at least one corresponding fan for generating said at least one type of air supply to the combustion chamber (7), and said at least one fan being configured for transmitting an air flow being variable according to the operating temperature in the combustion chamber (7), so as to control the release of energy from the combustion of the biomass in the combustion chamber (7), thus in order to enable a more constant release of energy in the combustion chamber (7) during the production of maple syrup;

iiii) an evaporator system (1) according to any one of the preceding combination(s), wherein a variation of the debit of air of said at least one fan of the air supply system (13) offering at least one type of air supply to the combustion chamber (7), is done by means of a controller according to a reading of the operating temperature inside of the combustion chamber (7);

jjjj) an evaporator system (1) according to any one of the preceding combination(s), wherein the evaporator system (1) includes a detector (47) of the composition of the exhaust gases in the combustion chamber (7) so as to be able to manage a control of the release of energy of the combustion of the biomass in the combustion chamber (7) according to a reading of the detector (47) of the composition of the exhaust gases;

kkkk) an evaporator system (1) according to any one of the preceding combination(s), wherein the door assembly (15) comprises an intermediate frame structure (15*f*) disposed between frontal and rearward face plates (15*g*,15*h*), the frontal and rearward face plates (15*g*, 15*h*) being removably mountable onto the intermediate frame structure (15*f*) via corresponding fasteners (45), and the intermediate frame structure (15*f*) defining a hollow body portion (21) for the door assembly (15);

llll) an evaporator system (1) according to any one of the preceding combination(s), wherein the frontal face (15*g*) plate is positioned, shaped and sized to cover a front side of the intermediate frame structure (15*f*), and wherein the rearward face plate (15*h*) is positioned, shaped and sized to partially cover a rear side of the intermediate frame structure (15*f*), so as to define at least one corresponding outer rearward inner aeration hole (19*b*) of the door assembly (15);

mmmm) an evaporator system (1) according to any one of the preceding combination(s), wherein the reward face plate (15*h*) is positioned, shaped and sized to cover a rear side of the intermediate frame structure (15*f*), and wherein the frontal face plate (15*g*) is positioned, shaped and sized to partially cover a front side of the intermediate frame structure (15*f*), so as to define at least one corresponding outer frontal inner aeration hole (19*b*) of the door assembly (15);

nnnn) an evaporator system (1) according to any one of the preceding combination(s), wherein the intermediate frame structure (15*f*) includes a hollow body portion (21) and a corresponding peripheral rim (15*i*), the peripheral rim (15*i*) of the intermediate frame structure (15*f*) being positioned, shaped and sized for providing the door assembly (15) with at least one corresponding outer aeration hole (19*a*);

oooo) an evaporator system (1) according to any one of the preceding combination(s), wherein peripheral rim (15*i*) of the intermediate frame structure (15*f*) is further positioned, shaped and sized for receiving corresponding components of a hinge mechanism (23) of the door assembly (15);

pppp) an evaporator system (1) according to any one of the preceding combination(s), wherein peripheral rim (15*i*) of the intermediate frame structure (15*f*) is further positioned, shaped and sized for receiving corresponding components of a blocking mechanism (49) of the door assembly (15);

qqqq) an evaporator system (1) according to any one of the preceding combination(s), wherein the blocking mechanism (49) of the door assembly (15) includes a latch component (51) and a corresponding catching component (53), the latch component (51) being pivotably mountable about a front side of the door assembly (15), and being also selectively operable between raised and lowered configurations, and the corresponding catching component (53) being removably removable about a corresponding side of the support frame (17) of the evaporator system (1) for removably receiving the latch component (51);

rrrr) an evaporator system (1) according to any one of the preceding combination(s), wherein the catching component (53) comprises a corresponding slit (53*a*) being positioned, shaped and sized for removably receiving the latch component (51) therein;

ssss) an evaporator system (1) according to any one of the preceding combination(s), wherein the blocking mechanism (49) of the door assembly (15) further includes a guiding component (55) being pivotably mountable about a lateral side of the door assembly (15), the guiding component (55) comprising a corresponding slot (55*a*) being positioned, shaped and sized for removably receiving the latch component (51) therethrough, and for guiding said latch component (51) during operation between the raised and lowered configurations;

tttt) an evaporator system (1) according to any one of the preceding combination(s), wherein the door assembly (15) is configured (ex. made symmetrical and/or set up differently and accordingly, etc.) so that corresponding hinge and blocking mechanisms (23,49) of the door assembly (15) are configured to be placed on either side of the door assembly (15);

uuuu) a kit with corresponding components for assembling an evaporator system (1) according to any one of the preceding combination(s); and vvvv) a door assembly (15) to be used with an evaporator system (1) according to any one of the preceding combination(s), wherein the door assembly (15) comprises at least one component and feature such as the one(s) described and/or illustrated in the present patent specification;

Indeed, and generally, as better illustrated in the enclosed drawings, the present evaporator system is used for the production of maple syrup (to be noted: the expression "maple syrup" in the context of the present patent specification must be interpreted in a "large" sense in that the present system can be used for the production of various other types of syrups, as evident for a person skilled in the art). The evaporator system comprises at least one receptacle (ex. boiling casserole and/or at least one caramelization casserole) for receiving and processing maple water destined to be transformed into maple syrup. The evaporator system also comprises a combustion chamber being operatively disposed with respect to said at least one receptacle for feeding the same with heat intended to be used in the transformation of the maple water into maple syrup, the combustion chamber having an inlet for receiving and burning biomass inside of the combustion chamber, exhaust gases of the combustion chamber being evacuated via a chimney of the evaporator system. This inlet can be simply, for example, a door assembly, such as the one described and/or illustrated herein, which can be operable between an opened position for receiving the biomass and a closed position for burning the biomass inside of the combustion chamber. Alternatively, it is possible to use the present evaporator system for controlling a standardized combustion of biomass such as wood granules and/or wood chips, for example. In such a case, the feeding could be done in a continuous manner via a specific access, therefore there is no door to be opened in order to carry out an addition of fuel, the frequency of feeding would be then controlled by the system, as apparent by a person skilled in the art. The evaporator system also comprises a detector of temperature being operatively connected to the combustion chamber for determining an operating temperature inside of the combustion chamber. The evaporator system also comprises an air supply system being operatively mounted with respect to the combustion chamber for feeding the same with air destined to be used in the combustion of the biomass, the air supply system offering at least one type of air supply to the combustion chamber selected from the group consisting of a primary air supply, a secondary air supply and an intermediate air supply, the air supply system including at least one corresponding fan for generating said at least one type of air supply to the combustion chamber, and said at least one fan being configured for transmitting an air flow being automatically variable according to the operating temperature in the combustion chamber, so as to control the release of energy from the combustion of the biomass in the combustion chamber, thus in order to enable a more constant release of energy in the combustion chamber during the production of maple syrup, etc.

According to a particular embodiment, the evaporator system comprises a detector of the composition of the exhaust gases in the combustion chamber so as to be able to manage a control of the release of energy of the combustion of the biomass in the combustion chamber according to a reading of the detector of the composition of the exhaust gases. The detector of the composition of the exhaust gases may be a detector of carbon dioxide ($CO_2$), for example. The detector of the composition of the exhaust gases is positioned in an outlet of the evaporator system, and optionally, the detector of the composition of the exhaust gases may be positioned in the chimney of the evaporator system, for example.

It is to be noted that the detection of the composition of the exhaust gases can be done with a device for detecting a conductivity of a flame of the combustion of the biomass. Also, the detection of the composition of the exhaust gases can be done with a lambda probe for measuring a ratio of $CO_2/O_2$.

Preferably, said at least one fan of the air supply system offering at least one type of air supply to the combustion chamber, is adjusted automatically so as to aim for a level of carbon dioxide ($CO_2$) ensuring an optimal combustion of the biomass (ex. a rate of carbon dioxide ($CO_2$) of about 12% in the exhaust gases of the combustion chamber of the evaporator system).

The air supply system offering at least one type of air supply to the combustion chamber, can be provided with a heat exchanger (namely, a heat exchanger enabling to preheat the combustion air). However, the present system can manage an evaporator without a heat exchanger as well.

Preferably, the air supply system offering at least one type of air supply to the combustion chamber, is provided with at least one corresponding modulating adjustment device (ex. a motor with variable speed, a shutter for regulating the influx of air, and/or any equivalent/appropriate device) for each type of air supply, and the evaporator system comprises a detector of temperature of the exhaust gases being positioned in an outlet (ex. the chimney and/or elsewhere) of the evaporator system.

According to a particular embodiment, the variation of the debit of air of said at least one fan of the air supply system offering at least one type of air supply to the combustion chamber, is done manually and/or automatically by means of a controller according to a reading of the operating temperature inside of the combustion chamber. The controller may include a "manual" mode and an "automatic" mode, for example.

Preferably, the fan of primary air, the fan of secondary air and/or a fan of intermediate air, are adjusted by a user of the evaporator system in accordance to the operating temperature desired in the combustion chamber, corresponding to a given setpoint temperature intended by an operator of the evaporator system. Typically, for the production of maple syrup, the given setpoint temperature is located between about 1200° F. and about 1900° F.

The combustion process may include a step where the fan of primary air is adjusted according to a desired temperature of the exhaust gases in the chimney of the evaporator system. The combustion process may also include a step of security where the fan of primary air is reduced or stopped if the operating temperature in the combustion chamber of the evaporator system reaches a predetermined value (ex. about 950° F.).

Optionally, the combustion process includes one and/or several of the following steps: a step where the fan of air is adjusted according to the operating temperature in the combustion chamber of the evaporator system, and a step where the fan of air is adjusted according to a desired temperature of the exhaust gases in the chimney of the evaporator system.

Preferably, the reload process includes a step where the fan of air is operated at different values, during at least one given range of time, and/or can also include a step where the fan of air is operated at zero, for example.

According to a possible embodiment, the evaporator system may include at least one detector of level of maple water in said at least one receptacle, and wherein a user of the present evaporator system adjustably and automatically controls a feeding of maple water into said at least one receptacle according to a level of maple water being detected, and may do so using "one single detector" only, for example.

The present invention also relates to evaporators (ex. gasification ones and/or) provided with such a controller of the release of energy, with devices and/or with necessary software(s) to put into practice the present invention, as well as to any other related and/or analogous inventive aspects. Namely, the present invention also concerns a kit with components destined to be assembled and/or to put into practice the present invention, and also relates to corresponding methods of assembling, operating and use associated thereto.

Several changes, additions, modifications and/or alterations can be made to the present evaporator system, without changing nor altering the nature and the scope of the present invention.

For example, concerning the management of the "temperature", it is important to note that the monitoring of the temperatures can be ensured by usual probes of measure of temperature that include, but are not limited to: thermocouple; thermistor; and/or infrared probe. Indeed, each detector temperature of the evaporator system could thus be a detector selected from the group consisting of thermometer, thermocouple, thermistor and/or infrared probe.

Furthermore, concerning the management of the "chemical composition" of the exhaust gases (typically carried out in the chimney, but could also be done elsewhere in the system), it is imported to note that the monitoring of the composition of the products of combustion can be ensured by usual probes of measure that include, but are not limited to: lambda probe for measuring the ratio $CO_2/O_2$; measure the electrical conductivity of the combustion products; and/or infrared.

Furthermore, concerning the management of the "air flow" (ex. primary, secondary and/or intermediate), it is important to note that an air flow can be carried out by: a) the natural pull of a chimney; b) mechanically with a fan, pressurizing air that is brought to the required locations; c) mechanically with a fan by sucking the combustion products towards an outside; d) mechanically by using a high-pressure jet of air in a venturi in order to pressurize air that will be brought to the required locations; and/or e) mechanically by using a high pressure jet of air downstream of the combustion chamber, which would cause an aspiration of the combustion products (ex. exhaust gases and/or other products of combustion) towards the outside, etc.

Indeed, the flow air is controllable and can be modulated, it is important to mention that even though the present invention could ultimately be operated with three (3) different types of air supplies (ex. primary, secondary and/or intermediate), the presence of these three (3) are not necessary in the context of the present invention, as apparent for a person skilled in the art. Indeed, for various small machines, the present system could be designed and operate with two (2) fans only rather than with three (3), and in certain cases, one could have one (1) single fan, such as the fan of primary air, for example, which could also feed the secondary air, for example. Consequently, and as previously mentioned, it is important to note that the advantage of the present evaporator system does not necessary reside and/or only in the number and/or the different types of air supplies possible (ex. primary, secondary, and/or intermediate) and/or on the different combinations thereof, but rather on the fact that the influx of air can be modulated according to the needs of the combustion, and on the fact that the present improved evaporator system, among various other advantages, enables a natural (i.e. non-forced, non-pulsated, non-driven, etc.) and/or gravity-fed introduction of secondary air into the combustion chamber thanks to an innovative door assembly being provided with a window assembly and integrated aeration holes, some of which being disposed about the window assembly, etc.

Furthermore, concerning the "controller", and/or the management of the "controller" of the evaporator system, it is important to mention that any other type of "controller" other than the one described in the present application could be used for the present evaporator system, to the extent that this "controller" can be a mechanical system, an electromechanical system, an electronic system, a processor and/or a computer that can be programmed with parameters having to be maintained during the operation of the evaporator system, such as for example: a) a setpoint temperature in the combustion chamber; b) a setpoint temperature downstream of the combustion chamber; c) composition of the combustion products; d) can include reaction algorithms that react in response to situations; e) can include an access control for human intervention; f) can monitor temperatures; g) can monitor the chemical composition of the combustion products; h) control the influx of combustion air; and/or i) react of the variation of the different parameters being monitored and in accordance to a lapse of time; etc., as apparent for a person skilled in the art.

As may now be better appreciated in view of the above, the present invention is particularly advantageous in that it enables to an improved evaporator system which, among various other advantages, enables a natural (i.e. non-forced, non-pulsated, non-driven, etc.) and/or gravity-fed introduction of secondary air into the combustion chamber thanks to an innovative door assembly being provided with a window assembly and integrated aeration holes, some of which being disposed about the window assembly, etc. The present invention is also advantageous in that it enables for conventional evaporator systems to be "converted" into improved evaporator systems, by simply "altering" them via a provision of the aforementioned door assembly. Indeed, the present door assembly (and resulting evaporator) is also innovative and advantageous in that combustion air (ex. secondary air) is brought and introduced into the combustion chamber, at strategic locations and levels within the combustion, for promoting, increasing and improving a resulting combustion of the biomass. Namely, the provision of inner aeration holes provided within the recessed window cavity generate a turbulent influx and/or vortices of secondary air, which is advantageous and beneficial for the combustion of the biomass inside the combustion chamber. Furthermore, not only does the window assembly and corresponding glass panel enable a user of the evaporator system to "visualize" the content of the combustion chamber and/or parameters (nature, quality, etc.) of the combustion process, when the door assembly is closed onto the evaporator system (ex. during the combustion process), but also, the window assembly and associated operative height (h) of the recessed window cavity is further configured to act as a "visual aid" or "fuel gage" (i.e. "biomass gage") for a user of the evaporator system, in terms of biomass to be introduced into the combustion chamber, with optimal levels of biomass in the combustion chamber corresponding to heights of biomass being present within a range of the first and second given operative levels, associated with corresponding bottom and top levels of the operative height (h) of the recessed window cavity. This is also advantageous in the door assembly and associated window assembly (and resulting evaporator system) are designed so that that the inner aeration holes of the bottom rim of the window assembly come into further play, when the combustion chamber is fully loaded with biomass, as advantageously desired (similarly, as to when "starting a fire", for example). Afterwards, as the biomass is burnt and consumed, and the height thereof lowers within the combustion chamber, the inner aeration holes of the top rim of the window assembly come into further play to maintain optimal levels of combustion, as also advantageously desired. The provision of the present door assembly is also advantageous in that air from the bottom plenum of the evaporator system can be directed (ex. naturally, and/or forcefully, via a fan, etc.) towards the aforementioned inner aeration holes (ex. top, bottom and/or side) provided about the window assembly. The provision of such inner aeration holes provided about the window assembly is also advantageous in that they enable the window assembly to remain substantially "clean" (i.e. less or little or no smoke stains, etc.), given the directionality of the air flow within the evaporator system, and the secondary air coming out from the inner aeration holes. The present evaporator system is also a considerable improvement over conventional evaporators in that the introduction of air into the plenum via a rearward air-intake opening (something that is not found in the industry), combined with the above-described components and features (ex. door assembly, window assembly and associated inner aeration holes, etc.) of the present evaporator system, enable for a more even heat distribution along the entire length of the combustion chamber, which in turn enables for a more even heat distribution under the at least one receptable (ex. cooking stage) along the longitudinal length thereof, for an improved quantity and/or quality of resulting syrup, as also advantageously desired.

As may now be better appreciated, the present system enables to operate an evaporator system and/or various aspects thereof (ex. combustion chamber, introduction of combustion air, etc.), for example, and to be able to do so in a quicker, simpler, more precise, more efficient, more economical, more reliable, more adjustable, more versatile, more adaptable, more durable, more environmentally conscientious, more desirable, and/or improved manner, than what is possible with the actual way of doing things.

Finally, and according to the present invention, the controller (and/or resulting system) and its corresponding parts are preferably made of substantially rigid materials, such as metallic materials (stainless steel, etc.), hardened polymers, composite materials, and/or any other appropriate material, whereas the other components of the system according to the present invention, in order to obtain the advantages discussed above, could be made of any other appropriate material, such as polymeric materials (ex. plastic, rubber, etc.), and/or any other suitable material, depending on the particular applications for which the system is intended for and the different parameters in cause, as apparent to a person skilled in the art.

Although the present invention has been previously explained by way of preferred embodiments, it is to be understood that any modification to these preferred embodiments is not considered changing nor altering the nature and the scope of the present invention. Indeed, the scope of the enclosed claim(s) should not be limited by the preferred embodiments set forth in the examples, but should be given the broadest interpretation consistent with the description as a whole.

The invention claimed is:

1. An evaporator system used for the production of maple syrup, the evaporator system comprising:
   at least one receptacle for receiving and processing maple water destined to be transformed into maple syrup;
   a combustion chamber being operatively disposed with respect to said at least one receptacle for providing the at least one receptacle with heat intended to be used in the transformation of the maple water into maple syrup, the combustion chamber having an inlet for receiving and burning biomass inside of the combustion chamber;
   an evacuation port being operatively and fluidly connected to the combustion chamber for evacuating exhaust gases from the combustion chamber via a corresponding chimney;
   an air supply system being operatively mounted with respect to the combustion chamber for feeding the combustion chamber with air intended to be used in the combustion of the biomass, the air supply system providing at least one type of air supply to the combustion chamber selected from the group consisting of at least primary air and secondary air; and
   a door assembly being configured for removably mounting onto a corresponding support frame of the evaporator system, and being operable between an opened configuration for allowing access to the combustion chamber and to be able to selectively feed biomass into the combustion chamber via the inlet thereof, and a closed configuration for preventing access to and closing off the inlet of the combustion chamber, the door assembly being provided with at least one aeration passage extending between an outer portion of the door assembly and an inner portion therefor, for providing a supply of secondary air to the combustion chamber via said at least one aeration passage of the door assembly when operated in the closed configuration;
   wherein the door assembly comprises a hollow body portion, and at least one outer aeration hole and at least one inner aeration hole, the at least one outer aeration hole being positioned, shaped and sized for receiving a supply of air from outside the combustion chamber when the door assembly is closed onto the evaporator system, and the at least one inner aeration hole being positioned, shaped and sized for releasing said supply of air into the combustion chamber as a supply of secondary air for the evaporator system when the door assembly is closed onto the evaporator system, the at least one outer aeration hole being fluidly connected to the at least one inner aeration hole via the hollow body portion of the door assembly.

2. An evaporator system according to claim 1, the evaporator system further including at least one of the following:
   wherein the at least one outer aeration hole includes at least one fontal outer aeration hole being provided about a frontal surface of the door assembly;
   wherein the at least one outer aeration hole includes a plurality of frontal outer aeration holes being provided about the frontal surface of the door assembly;
   wherein the frontal outer aeration holes are separate from one another;
   wherein the frontal outer aeration holes include circular frontal outer aeration holes, with each circular frontal outer aeration hole;
   wherein the frontal outer aeration holes include square frontal outer aeration holes, with each square frontal outer aeration hole having a given side length;

wherein the frontal outer aeration holes include oblong frontal outer aeration holes with each oblong frontal outer aeration hole having a given length being longer than a given width thereof;

wherein the oblong frontal outer aeration holes are orientated such that the lengths thereof are parallel to a given upright direction of the door assembly;

wherein the oblong frontal outer aeration holes are orientated such that the lengths thereof are parallel to a given transversal direction of the door assembly; and wherein the oblong frontal outer aeration holes are orientated such that the lengths thereof are slanted with respect to a given orthogonal direction of the door assembly.

3. An evaporator system according to claim 2, the evaporator system further including at least one of the following:

wherein the at least one outer aeration hole includes at least one lateral outer aeration hole being provided about a lateral surface of the door assembly;

wherein the at least one outer aeration hole includes a plurality of lateral outer aeration holes being provided about the lateral surface of the door assembly;

wherein the lateral outer aeration holes include at least one lateral outer aeration hole being provided about a top lateral surface of the door assembly;

wherein the lateral outer aeration holes include at least one lateral outer aeration hole being provided about a bottom lateral surface of the door assembly;

wherein the lateral outer aeration holes include at least one lateral outer aeration hole being provided about a side lateral surface of the door assembly;

wherein the lateral outer aeration holes are separate from one another;

wherein the lateral outer aeration holes include circular lateral outer aeration holes, with each circular lateral outer aeration hole having a given diameter;

wherein the lateral outer aeration holes include square lateral outer aeration holes, with each square lateral outer aeration hole having a given side length;

wherein the lateral outer aeration holes include oblong lateral outer aeration holes with each oblong lateral outer aeration hole having a given length being longer than a given width thereof;

wherein the oblong lateral outer aeration holes are orientated such that the lengths thereof are parallel to a given transversal direction of the door assembly;

wherein the oblong lateral outer aeration holes are orientated such that the lengths thereof are parallel to a given longitudinal direction of the door assembly;

wherein the oblong lateral outer aeration holes are orientated such that the lengths thereof are slanted with respect to a given orthogonal direction of the door assembly;

wherein the lateral outer aeration holes include a plurality of top lateral outer aeration holes being provided about a top lateral edge of the door assembly;

wherein one of said top lateral outer aeration holes is further positioned, shaped and sized for removably and selectively receiving a top component of a hinge mechanism of the door assembly, via at least one corresponding fastener;

wherein the lateral outer aeration holes include a plurality of bottom lateral outer aeration holes being provided about a bottom lateral edge of the door assembly; and wherein one of said bottom lateral outer aeration holes is further positioned, shaped and sized for removably and selectively receiving a bottom component of the hinge mechanism of the door assembly, via at least one corresponding fastener.

4. An evaporator system according to claim 3, the evaporator system further including at least one of the following:

wherein the at least one outer aeration hole includes at least one rearward outer aeration hole being provided about a rearward surface of the door assembly;

wherein the at least one rearward outer aeration hole extends along a corresponding peripheral edge of the rearward surface of the door assembly;

wherein the at least one rearward outer aeration hole extends along at least a top peripheral edge of the rearward surface of the door assembly;

wherein the at least one rearward outer aeration hole extends along at least a bottom peripheral edge of the rearward surface of the door assembly;

wherein the at least one rearward outer aeration hole extends along at least one side peripheral edge of the rearward surface of the door assembly;

wherein the at least one rearward outer aeration hole extends along at least a pair of opposite side peripheral edges of the rearward surface of the door assembly;

wherein the at least one rearward outer aeration hole extends along a complete circumferential peripheral edge of the rearward surface of the door assembly; and wherein the at least one rearward outer aeration hole is a circumferential peripheral rearward outer aeration channel.

5. An evaporator system according to claim 4, the evaporator system further including at least one of the following:

wherein the at least one inner aeration hole includes at least one bottom rearward inner aeration hole being provided about a bottom portion of the rearward surface of the door assembly, said at least one bottom rearward inner aeration hole being positioned, shaped and sized so as to be fluidly connectable to a corresponding plenum of the evaporator system when the door assembly is operated in the closed configuration; and wherein the at least one bottom rearward inner aeration hole has a geometrical profile being complementary to a corresponding opening of the plenum of the evaporator system.

6. An evaporator system according to claim 5, the evaporator system further including at least one of the following:

wherein the door assembly comprises opposite top and bottom portions delimited by a corresponding intermediate section; and wherein the top and bottom portions of the door assembly each have a substantially trapezoidal profile, and wherein a narrowest width portion of the door assembly extends along the intermediate section of the door assembly.

7. An evaporator system according to claim 6, the evaporator system further including at least one of the following:

wherein the door assembly is provided with a window assembly extending between frontal and rearward surfaces of the door assembly, the window assembly being provided with a least one glass panel for allowing a user of the evaporator system to visualize the content of the combustion chamber when the door assembly is closed onto the evaporator system;

wherein the window assembly further comprises at least one gasket for cooperating with said at least one glass panel; and wherein the at least one inner aeration hole is provided about the rearward surface of the door assembly, adjacent to the window assembly.

8. An evaporator system according to claim 7, the evaporator system further including at least one of the following:
wherein the window assembly is positioned, shaped and sized about the door assembly so as to define a recessed window cavity about the rearward surface of the door assembly, and within a main body portion of the door assembly;
wherein at least one inner aeration hole includes at least one corresponding inner aeration hole being provided about a corresponding inner rim of the recessed window cavity;
wherein the at least one inner aeration hole includes at least one window-top inner aeration hole being provided about a top inner rim of the recessed window cavity;
wherein the at least one inner aeration hole includes at least one window-bottom inner aeration hole being provided about a bottom inner rim of the recessed window cavity;
wherein the at least one inner aeration hole includes at least one window-side inner aeration hole being provided about a side inner rim of the recessed window cavity; and
wherein the at least one inner aeration hole includes at least one pair of window-side inner aeration holes being provided about a pair of opposite side inner rims of the recessed window cavity.

9. An evaporator system according to claim 8, the evaporator system further including at least one of the following:
wherein the at least one inner aeration hole includes a plurality of different inner aeration holes;
wherein the inner aeration holes are separate from one another;
wherein the inner aeration holes include circular inner aeration holes with each circular inner aeration hole having a given diameter;
wherein the inner aeration holes include square inner aeration holes, with each square inner aeration hole having a given side length;
wherein the inner aeration holes include oblong inner aeration holes with each oblong inner aeration hole having a given length being longer than a given width thereof;
wherein the oblong inner aeration holes are orientated such that the lengths thereof are parallel to a given transversal direction of the door assembly;
wherein the oblong inner aeration holes are orientated such that the lengths thereof are parallel to a given longitudinal direction of the door assembly;
wherein the oblong inner aeration holes are orientated such that the lengths thereof are slanted with respect to a given orthogonal direction of the door assembly;
wherein the oblong inner aeration holes are provided about at least opposite top and bottom inner rims of the recessed window cavity;
wherein the oblong inner aeration holes are provided about at least opposite left and right inner rims of the recessed window cavity;
wherein the recessed window cavity and associated at least one glass panel of the window assembly are substantially rectangular, and are provided with a corresponding operative height and a corresponding operative width; and wherein the operative width of the recessed window cavity corresponds to at least 40% of a corresponding width of the inlet of the combustion chamber.

10. An evaporator system according to claim 9, the evaporator system further including at least one of the following:
wherein the recessed window cavity includes an operative viewing surface corresponding to at least 20% of a biomass-receiving surface of a corresponding hearth associated to the evaporator system.

11. An evaporator system according to claim 10, wherein the evaporator system is configured so that the combustion chamber is substantially sealed when the door assembly is operated into the closed configuration.

12. An evaporator system according to claim 11, the evaporator system further including at least one of the following:
wherein a first sealing component is provided about the rearward surface of the door assembly, and around the recess window cavity thereof, said first sealing component being positioned, shaped and sized for sealing off the inlet of the combustion chamber when the door assembly is closed off onto the evaporator system;
wherein the first sealing component is made of a substantially flexible and heat-resistant material;
wherein a second sealing component is provided about the rearward surface of the door assembly, and around a bottom rearward inner aeration hole thereof, said second sealing component being positioned, shaped and sized for sealing off the plenum of the combustion chamber when the door assembly is closed off onto the evaporator system; and
wherein the second sealing component is made of a substantially flexible and heat-resistant material.

13. An evaporator system according to claim 12, the evaporator system further including at least one of the following:
wherein the evaporator system comprises a plenum being operatively disposed below the combustion chamber and being fluidly connected to said combustion chamber for providing the combustion chamber with a supply of primary air;
wherein a hearth is operatively disposed between the combustion chamber and the plenum;
wherein the hearth includes corresponding grills to allow a passage of air from the plenum to the combustion chamber;
wherein the door assembly is positioned, shaped and sized so that at least one inner aeration hole of the door assembly is positioned adjacent to the hearth, when the door assembly is closed off onto the evaporator system, in order to provide the combustion chamber with a given influx of air;
wherein the door assembly is positioned, shaped and sized so that at least one bottom inner aeration hole of the door assembly is positioned at a first given operative level adjacent to the hearth, when the door assembly is closed off onto the evaporator system, in order to provide the combustion chamber with a given bottom influx of secondary air;
wherein the door assembly is positioned, shaped and sized so that at least one top inner aeration hole of the door assembly is positioned at a second given operative level above the hearth, when the door assembly is closed off onto the evaporator system, in order to provide the combustion chamber with a given top influx of secondary air;

wherein the at least one bottom inner aeration hole of the door assembly is provided about a bottom inner rim of the recessed window cavity, and wherein the at least one top inner aeration hole of the door assembly is provided about a top inner rim of the recessed window cavity;

wherein the operative height of the recessed window cavity is further configured to act as a visual aid for a user of the evaporator system, in terms of biomass to be introduced into the combustion chamber, with optimal levels of biomass in the combustion chamber corresponding to heights of biomass being present within a range of the first and second given operative levels, associated with corresponding bottom and top levels of the operative height of the recessed window cavity;

wherein separate inner aeration holes of the door assembly positioned at different locations and levels in order to create turbulent air flows about the window cavity, when the door assembly is closed off onto the evaporator system, in order to aid with the combustion of the biomass inside the combustion chamber; and wherein the door assembly is positioned, shaped and sized so that at least one top inner aeration hole of the door assembly is positioned above of the hearth.

14. An evaporator system according to claim 13, the evaporator system further including at least one of the following:

wherein the plenum has a frontal air-intake opening provided about a front portion of the support frame of the evaporator system;

wherein the door assembly of the evaporator system is further positioned, shaped and sized so that the frontal air-intake opening of the plenum is exposed and accessible when the door assembly is operated in the opened configuration, and so that said frontal air-intake opening of the plenum is closed off by the door assembly when operated in the closed configuration;

wherein the door assembly of the evaporator system is further positioned, shaped and sized so that said frontal air-intake opening of the plenum be fluidly connectable to a corresponding inner aeration hole of the door assembly when the door assembly is operated in the closed configuration; and wherein the plenum has a rearward air-intake opening provided about a rearward portion of the support frame of the evaporator system, said rearward air-intake opening of the plenum being selectively operable and adjustable to provide the combustion chamber with a supply of primary air.

15. An evaporator system according to claim 14, the evaporator system further including at least one of the following:

wherein the at least one receptacle includes a bottom section having plurality of segmented sections, said plurality of segmented sections having an exposed surface for heat transfer with the combustion chamber, as well a spanning surface extending longitudinally along the evaporator system, the ratio of the exposed surface and the spanning surface being greater than about 1.75; and wherein the at least one receptacle is selected from the group consisting of an evaporation receptacle, a cooking receptacle and a combined receptacle.

16. An evaporator system according to claim 15, wherein the hearth has dimensions in accordance with a formula defined by the following expression: $a = B \times A^{-0.409}$ and $a = A \times A^{-0.316}$, where:

a=surface of the hearth;
B=surface of a boiling portion of the at least one receptacle; and
A=total surface occupied by the at least one receptacle.

17. An evaporator system according to claim 16, the evaporator system further including at least one of the following:

wherein the evaporator system includes a detector of temperature being operatively connected to the combustion chamber for determining an operating temperature inside of the combustion chamber;

wherein the air supply system offering at least one type of air supply to the combustion chamber is provided with at least one corresponding modulating adjustment mean for selectively controlling a corresponding influx of air into the combustion chamber;

wherein the air supply system includes at least one corresponding fan for generating said at least one type of air supply to the combustion chamber, and said at least one fan being configured for transmitting an air flow being variable according to the operating temperature in the combustion chamber, so as to control the release of energy from the combustion of the biomass in the combustion chamber, thus in order to enable a more constant release of energy in the combustion chamber during the production of maple syrup;

wherein a variation of a debit of air of said at least one fan of the air supply system offering at least one type of air supply to the combustion chamber, is done by means of a controller according to a reading of the operating temperature inside of the combustion chamber; and wherein the evaporator system includes a detector of the composition of the exhaust gases in the combustion chamber so as to be able to manage a control of the release of energy of the combustion of the biomass in the combustion chamber according to a reading of the detector of the composition of the exhaust gases.

18. An evaporator system according to claim 17, the evaporator system further including at least one of the following:

wherein the door assembly comprises an intermediate frame structure disposed between frontal and rearward face plates, the frontal and rearward face plates being removably mountable onto the intermediate frame structure via corresponding fasteners, and the intermediate frame structure defining a hollow body portion for the door assembly;

wherein the frontal face plate is positioned, shaped and sized to cover a front side of the intermediate frame structure, and wherein the rearward face plate is positioned, shaped and sized to partially cover a rear side of the intermediate frame structure, so as to define at least one corresponding outer rearward inner aeration hole of the door assembly;

wherein the reward face plate is positioned, shaped and sized to cover a rear side of the intermediate frame structure, and wherein the frontal face plate is positioned, shaped and sized to partially cover a front side of the intermediate frame structure, so as to define at least one corresponding outer frontal inner aeration hole of the door assembly;

wherein the intermediate frame structure includes a hollow body portion and a corresponding peripheral rim, the peripheral rim of the intermediate frame structure being positioned, shaped and sized for providing the door assembly with at least one corresponding outer aeration hole; and wherein peripheral rim of the intermediate frame structure is further positioned, shaped and sized for receiving corresponding components of a hinge mechanism of the door assembly.

19. An evaporator system according to claim 18, the evaporator system further including at least one of the following:

wherein peripheral rim of the intermediate frame structure is further positioned, shaped and sized for receiving corresponding components of a blocking mechanism of the door assembly;

wherein the blocking mechanism of the door assembly includes a latch component and a corresponding catching component, the latch component being pivotably mountable about a front side of the door assembly, and being also selectively operable between raised and lowered configurations, and the corresponding catching component being removably removable about a corresponding side of the support frame of the evaporator system for removably receiving the latch component;

wherein the catching component comprises a corresponding slit being positioned, shaped and sized for removably receiving the latch component therein;

wherein the blocking mechanism of the door assembly further includes a guiding component being pivotably mountable about a lateral side of the door assembly, the guiding component comprising a corresponding slot being positioned, shaped and sized for removably receiving the latch component therethrough, and for guiding said latch component during operation between the raised and lowered configurations; and wherein the door assembly is configured so that corresponding hinge and blocking mechanisms of the door assembly are configured to be placed on either side of the door assembly.

\* \* \* \* \*